(12) United States Patent
Romig et al.

(10) Patent No.: US 10,609,854 B2
(45) Date of Patent: Apr. 7, 2020

(54) PARALLEL HITCHING FOR MODULAR POWER UNITS

(71) Applicant: Deere & Company, Moline, IL (US)

(72) Inventors: Bernard E. Romig, Illinois City, IL (US); Noel W. Anderson, Fargo, ND (US); Terence D. Pickett, Waukee, IA (US)

(73) Assignee: Deere & Company, Moline, IL (US)

( * ) Notice: Subject to any disclaimer, the term of this patent is extended or adjusted under 35 U.S.C. 154(b) by 983 days.

(21) Appl. No.: 15/042,498

(22) Filed: Feb. 12, 2016

(65) Prior Publication Data

US 2017/0231146 A1    Aug. 17, 2017

(51) Int. Cl.
| | | |
|---|---|---|
| *A01B 59/00* | (2006.01) |
| *A01B 63/111* | (2006.01) |
| *B62D 49/06* | (2006.01) |
| *A01B 59/042* | (2006.01) |
| *A01B 79/00* | (2006.01) |

(52) U.S. Cl.
CPC .......... *A01B 59/002* (2013.01); *A01B 59/042* (2013.01); *A01B 63/1117* (2013.01); *A01B 79/00* (2013.01); *B62D 49/0642* (2013.01)

(58) Field of Classification Search
CPC ...... A01B 59/002; A01B 79/00; B62D 12/02; B62D 49/0642
See application file for complete search history.

(56) References Cited

U.S. PATENT DOCUMENTS

| | | | |
|---|---|---|---|
| 1,310,604 A | 7/1919 | Burgess | |
| 2,432,417 A * | 12/1947 | Heath | B62D 49/0642 |
| | | | 172/678 |
| 2,551,231 A * | 5/1951 | Anderson | B62D 49/0642 |
| | | | 180/14.2 |
| 3,035,653 A * | 5/1962 | Steepe | B62D 49/0642 |
| | | | 105/61 |
| 3,477,534 A | 11/1969 | Ladwig | |
| 3,552,497 A | 1/1971 | Stedman | |
| 3,572,444 A | 3/1971 | Scholl | |
| 3,601,210 A | 8/1971 | Daft | |
| 3,605,928 A | 9/1971 | Loesch | |

(Continued)

FOREIGN PATENT DOCUMENTS

WO    2015173073 A1    11/2015

OTHER PUBLICATIONS http://ir.uz.ac.zw/jspui/bitstream/10646/392/1/14%20Draught%20animal%20harnessing.pdf (accessed Sep. 12, 2012, 10:00 AM CDT), 20 pages.

(Continued)

*Primary Examiner* — Thomas B Will
*Assistant Examiner* — Joel F. Mitchell
(74) *Attorney, Agent, or Firm* — Joseph R. Kelly; Kelly, Holt & Christenson PLLC

(57) ABSTRACT

During coordinated operation of multiple different modular traction power units (MPUs), a desired change in relative tractive effort contributed by each of the MPUs is identified. Relative distances between a connection point for each MPU and an implement hitch point is determined, in order to identify a hitch bar target position that will achieve the identified relative tractive effort contribution. The hitch bar is adjusted to make distance adjustments, based on the target position, to achieve the identified relative tractive effort for the MPUs.

20 Claims, 13 Drawing Sheets

(56) References Cited

U.S. PATENT DOCUMENTS

| | | | |
|---|---|---|---|
| 3,651,882 A * | 3/1972 | Loesch | B62D 12/02 137/899 |
| 3,661,214 A | 5/1972 | Teasdale | |
| 3,823,782 A * | 7/1974 | Howland | E02F 3/76 172/292 |
| 3,994,349 A | 11/1976 | Rockwell | |
| 4,053,021 A | 10/1977 | Sturges | |
| 4,085,813 A * | 4/1978 | Joubert | B62D 12/02 180/14.2 |
| 4,086,975 A * | 5/1978 | Nystuen | B62D 12/02 180/11 |
| 4,171,023 A | 10/1979 | Sturges | |
| 4,819,738 A * | 4/1989 | Fountain | A01B 51/023 172/248 |
| 4,838,173 A | 6/1989 | Schroeder et al. | |
| 5,363,935 A | 11/1994 | Schempf et al. | |
| 7,054,731 B1 * | 5/2006 | Lange et al. | A01B 69/008 172/4.5 |
| 8,406,966 B2 * | 3/2013 | Schedgick et al. | A01B 63/114 172/239 |
| 9,002,591 B2 | 4/2015 | Wang et al. | |
| 9,296,411 B2 | 3/2016 | Hornberger | |
| 2007/0194557 A1 | 8/2007 | Caporali et al. | |
| 2008/0177435 A1 | 7/2008 | Caporali et al. | |
| 2011/0162857 A1 | 7/2011 | Hendron et al. | |

OTHER PUBLICATIONS http://4h.wsu.edu/em2778cd/pdf/eb1135e.pdf (accessed Sep. 12, 2012 at 10:30 AM CDT) 28 pages.

http://ytforums.ytmag.com/ttforum/viewtopic.php?p=5253987&sid=a137e38128503fb33da456a3c823cb3e. Accessed Feb. 9, 2016. 4 pages.

http://en.wikipedia.org/wiki/Whippletree_(mechanism). • This page was last modified on Nov. 28, 2014, at 03:25. 6 pages.

http://www.youtube.com/watch?v=ispzKsaQM7Q Uploaded on Sep. 22, 2009, 2 pages.

o http://www.youtube.com/watch?v=QLb0b42skmg Uploaded on Aug. 1, 2011, 2 pages.

http://www.nda.agric.za/docs/infopaks/Animaltraction.pdf, 1997, 22 pages.

http://www.nzdl.org/gsdlmod?e=d-00000-00---off-0hdl--00-0----000-0-10-0---0---0direct-10---4-------0-1l-11-en-50---20-home---00-0-1-00-0-0-11-1-0utfZz-8-00&a=d&cl=CL1.1&d=HASH0113c7507f62288f1860ce3b.9.d. Accessed Jan. 21, 2019. 40 pages.

* cited by examiner

PARALLEL HITCHING FOR MODULAR POWER UNITS

FIELD OF THE DESCRIPTION

The present description relates to the use of multiple modular power units in conjunction with one another. More specifically, the present description relates to hitching and coordinating control of multiple module power units.

BACKGROUND

There are a wide variety of different types of modular traction power units (or MPUs). Some common types of MPUs include tractors, all-terrain vehicles, and other vehicles that are capable of applying tractive forces, for example, to pull an implement.

At times, a particular application may benefit from combining tractive efforts of multiple MPUs. For instance, in a scenario in which a towed load is too heavy for a single MPU to pull, that scenario may benefit from combining multiple MPUs in order to apply tractive effort to pull the load. In such scenarios, multiple MPUs have been connected to one another in different ways in an effort to combine the tractive efforts of the multiple MPUs.

In one type of combination, the MPUs are connected in series with one another. However, with an increased number of MPUs connected in series, the force vectors can quickly become misaligned with the towed implement, especially on turns.

Some have attempted to address this issue by connecting the MPUs in parallel with one another. However, the MPUs may be mismatched in that one MPU may have the ability to exert higher tractive forces than the others. This has been handled in various ways. For instance, where the MPUs are animals (such as oxen, horses, mules, etc.) an operator provides supervision and direction through, for instance, voice, reigns, a whip, etc. The animals tend to learn how to modify their tractive efforts through various maneuvers, such as turns.

Where the MPUs are machines, such as tractors, they have often each needed an operator to provide guidance and position synchronization. Such approaches have often had a mechanical connection both at the front and the rear of the MPUs in order to maintain relative position and to guide direction of the individual machines.

The discussion above is merely provided for general background information and is not intended to be used as an aid in determining the scope of the claimed subject matter.

SUMMARY

During coordinated operation of multiple different modular traction power units (MPUs), which are connected in parallel with one another, a desired change in relative tractive effort contributed by each of the MPUs is identified. Relative distances between a connection point for each MPU and an implement hitch point is determined, in order to identify a hitch bar target position that will achieve the identified relative tractive effort contributions. The hitch bar is adjusted, based on the target position, to achieve the identified relative tractive effort contributions for the MPUs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
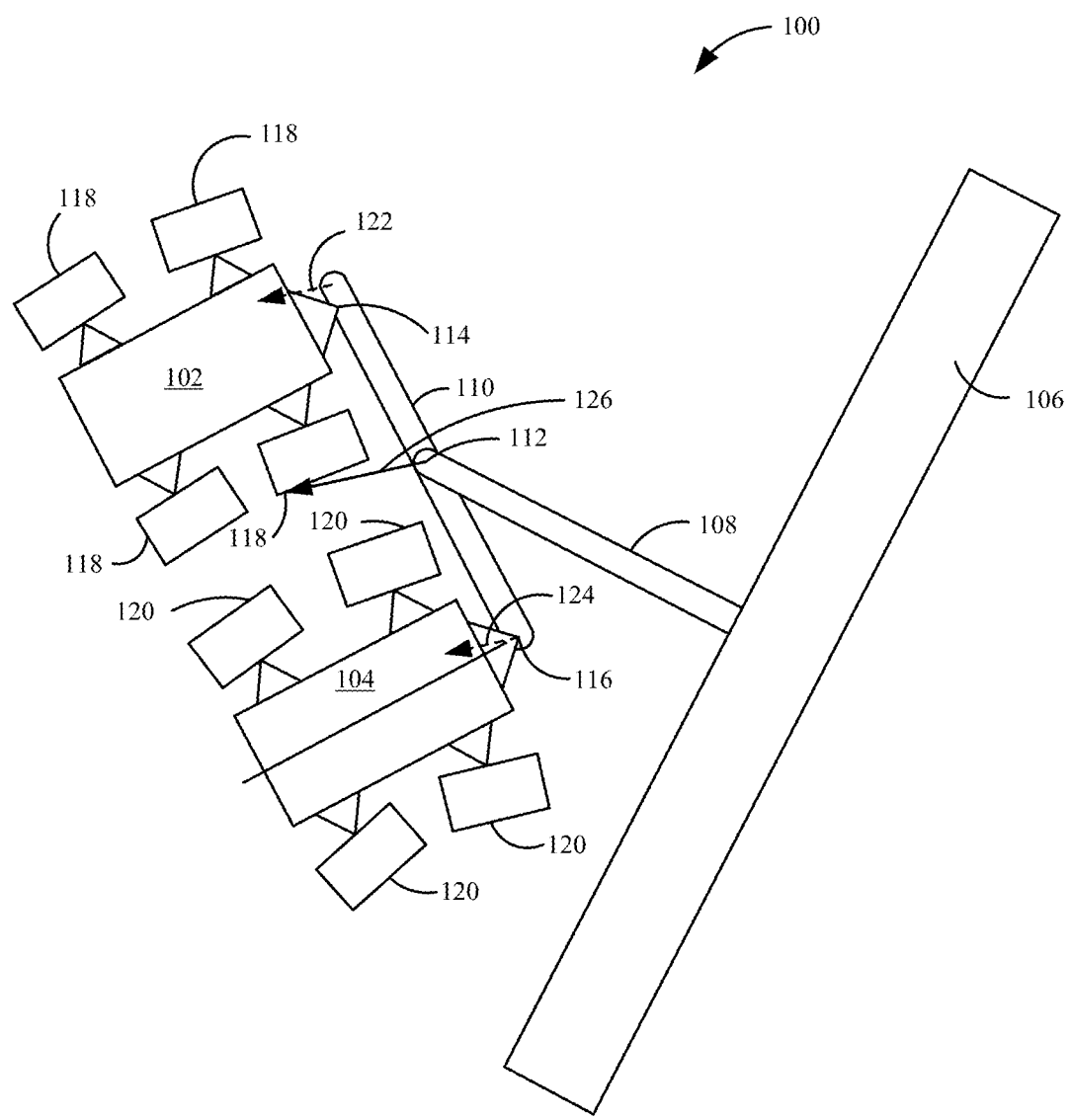
FIG. 1 is a block diagram showing an MPU configuration in which multiple MPUs connected in parallel to tow an implement.

FIG. 1 is a block diagram of one example of an MPU configuration 100 in which a plurality of different MPUs 102-104 are connected, in parallel, to tow an implement 106. Implement 106 is connected to a draw bar 108 which is, in turn, pivotally connected to a hitch bar 110, at an implement hitch point 112. MPU 102 is also pivotally connected to the hitch bar 110 at MPU hitch point 114. MPU 104 is pivotally connected to hitch bar 110 at MPU hitch point 116. MPUs 102-104 each have a plurality of ground engaging members (such as wheels 118-120), respectively. In various examples, the wheels 118-120 contact the ground to exert tractive force on the ground to propel the MPUs. The ground engaging members could other be members as well, such as tracks, etc. In any case, the ground engaging members can also be controlled to steer the corresponding MPUs. For instance, they can be steered together, they can be individually steerable, and also individually drivable. They can also be driven in pairs, as a set, or in any different combination.

MPU 102 illustratively exerts a tractive force on hitch bar 110 in the direction indicated by arrow 122. MPU 104 illustratively exerts a tractive force, in the direction indicated by arrow 124. The combination of the tractive forces exerted by MPUs 102-104 is illustrated by arrow 126.

Before proceeding with the discussion, it is worth noting that the present discussion proceeds with respect to two different MPUs 102 and 104 connected in parallel to implement 106. The present discussion could just as easily apply to a greater number of MPUs, and the discussion proceeds with respect to two MPUs for the sake of example only.

It can be seen that, in various scenarios, the contribution to the overall tractive force provided by the two different MPUs 102 and 104 may desirably be varied. For instance, during certain maneuvers (such as turning), it may be desirable to have one MPU exert more tractive effort on the implement 106 than the other, or to control one or both MPUs so that they both exert the same tractive effort on implement 106, even during a turn. Similarly, it may be that the two different MPUs 102 and 104 may have different power ratings resulting in different capacities to exert tractive effort (e.g., tractive force) on implement 106. In that case, it may be desirable to adjust the configuration to accommodate for the different capacities of the various MPUs. Similarly, there may be conditions under which it is desirable to preferentially attribute more tractive effort to one MPU (such as if the other is traveling in mud, or slipping for some reason). This can be done by dynamically changing the length of different portions of hitch bar 110. By dynamically, it is meant that the length of the hitch bar is changed without needing to stop movement of the MPUs.

For instance, if MPU 102 has a tractive capacity that is approximately one half of that of MPU 104, then in order for the force vectors 122 and 124 to be equal to one another, the distance between implement hitch point 112 and MPU hitch point 114 may be adjusted to be approximately twice as large as the distance between implement hitch point 112 and MPU hitch point 116. The present system thus provides a dynamically adjustable hitch bar 110 so that the distances between the implement hitch point 112 and the various MPU hitch points 114, 116 can be dynamically adjusted, during operation, in order to obtain coordinated operation of multiple MPUs, connected in parallel, in towing implement 106.

Figure 2A:
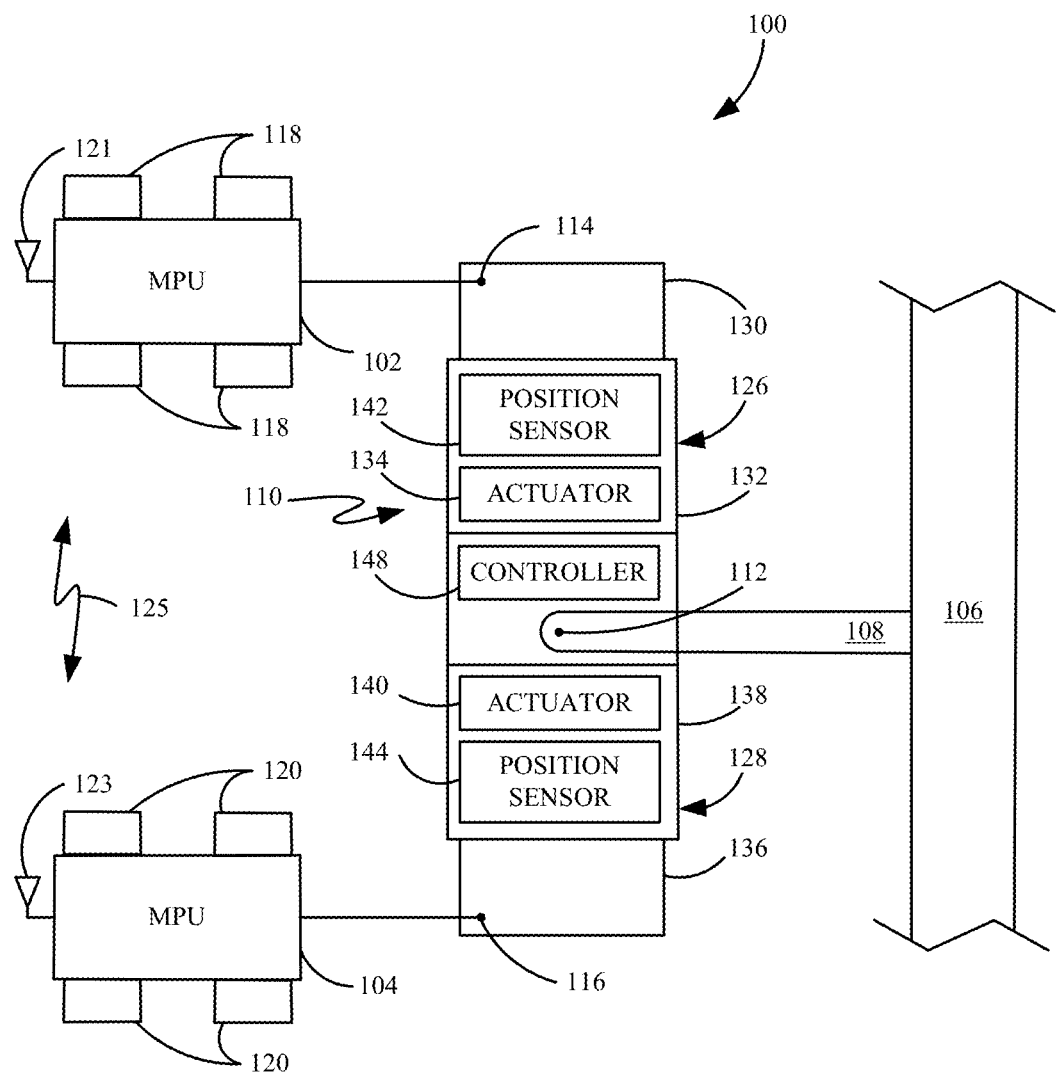
FIG. 2A is a block diagram showing one example of a hitch bar, in more detail.

FIG. 2A shows an example of configuration 100 (shown in FIG. 1) in which one example of hitch bar 110 is shown in more detail. In FIG. 2A, hitch bar 112 illustratively includes first hitch bar portion 126 and second hitch bar portion 128. First and second hitch bar portions 126 and 128 are illustratively movable so their lengths can be changed. They can take a wide variety of different forms, but in one example, each portion 126 and 128 comprises a hydraulic cylinder. Therefore, hitch bar portion 126 illustratively has an inner extending portion 130 and an outer fixed portion 132. Portions 130 and 132 are illustratively movable relative to one another by an actuator 134, which may be one or more hydraulic valves that controllably drive extension and retraction of extending portion 130 out of, and into, fixed portion 132, respectively.

Similarly, hitch bar portion 128 also illustratively comprises a hydraulic cylinder with an inner extending portion 136 and an outer fixed portion 138, that are connected to one another for relative movement by actuator 140. Actuator 140 illustratively drives extension and retraction of portion 136 relative to portion 138.

It will be noted that, while actuators 134 and 140 are described as controllable hydraulic valves, they can take a wide variety of forms. For instance, they can include a hydraulic or electric motor with a screw or gear drive, they can include air over hydraulic actuators, or a wide variety of other actuators. In addition, power for the actuators and other items may come from implement 106, from either MPU 102 or 104, or from a power unit (such as an electrical generator) mounted to hitch bar 110, or elsewhere. In the example in which the actuators 134 and 140 comprise hydraulic values that provide hydraulic fluid to hydraulic cylinders, the hydraulic fluid can be provided from one of the MPUs 102 and 104, through a suitable hydraulic connection.

It should also be noted that while hitch bar positions 126 and 128 have extending portions 130 and 136, and fixed portions 132 and 138, the reverse case is possible. Instead of having the movable portions be portions 130 and 136, they could be portions 132 and 138. In addition, the hitch bar portions 126 and 128 may each include more than two parts or segments, and may extend in ways other than "telescoping". The particular configuration illustrated and described in FIG. 2A is illustrated and described for the sake of example only.

It will also be noted that, while hitch bar 110 is shown with two portions 126 and 128, the particular number of portions (or segments) of hitch bar 110 can vary widely, and may depend on the particular application. In addition, hitch bar 110 can be a single wing adjustable bar in which case the length of only one hitch bar portion (126 or 128) of hitch bar 110 is adjustable. Further, it could be a multiple wing adjustable bar in which case the distance between any MPU hitch point and the implement hitch point may be adjusted. The present description considers the case of two MPUs 102 and 104 and a two wing adjustable bar, but the same principles extend to larger numbers of MPUs and adjustable segments as well. In one example, each hitch bar portion 126 and 128 has a corresponding position sensor 142 and 144, respectively. Position sensors 142 and 144 illustratively generate a signal that is indicative of a position of the corresponding extending portion 130 and 136, relative to fixed portion 132 and 138. Thus, based on the signal from position sensors 142 and 144, the distance between implement hitch point 112 and both of the MPU hitch points 114 and 116 can be determined, such as through direct measurement or calculation. Position sensors 142 and 144 can take a wide variety of different forms. For instance, they can include in-cylinder distance measurement sensors, time-of-flight sensors (such as laser or sound reflection sensors), rollers with odometers in contact with the extending portions 130-136, readers of RFID or optical codes (such as bar codes) that are printed on the hydraulic cylinders and denote position of extending portions 130 and 136, Hall effect sensors, potentiometers, etc.

FIG. 2A also shows that, in one example, hitch bar 110 illustratively includes a controller 148. Controller 148 illustratively receives the position sensor signals from position sensors 142 and 144, and receives a target position indicative of a desired position of the corresponding hydraulic actuators. It can then perform closed loop control using the position signals from position sensors 142 and 144, and using the target position, in order to control actuators 134 and 140, to obtain the desired distances. It will be noted that, in one example, controller 148 can be located on either MPU 102 or MPU 104, or, as illustrated in FIG. 2A, on hitch bar 110, itself. It can also be located on implement 106 or remotely and communicate with actuators 134 and 140, and with position sensors 142 and 144, using a wireless or wired data link. Similarly, it can use a wireless data link even when it is located on hitch bar 110 or one of MPUs 102 and 104, or it can be use a hard wired harness or other wiring assembly as well. In one example, controller 148 (or another controller or processor which may be located on either of the MPUs 102 or 104, or elsewhere) illustratively determines a relative target position of implement hitch point 112 relative to either or both MPU hitch points 114 and 116 and uses that, and the position signals to control actuators 134 and 140.

In one example, MPUs 102 and 104 each include a communication antenna 121 and 123, respectively. They can be used in conjunction with communication component (described in greater detail below) so that MPUs 102 and 104 can communicate with one another and with other items over a wireless communication link 125. This is just one example.

Figure 2B:
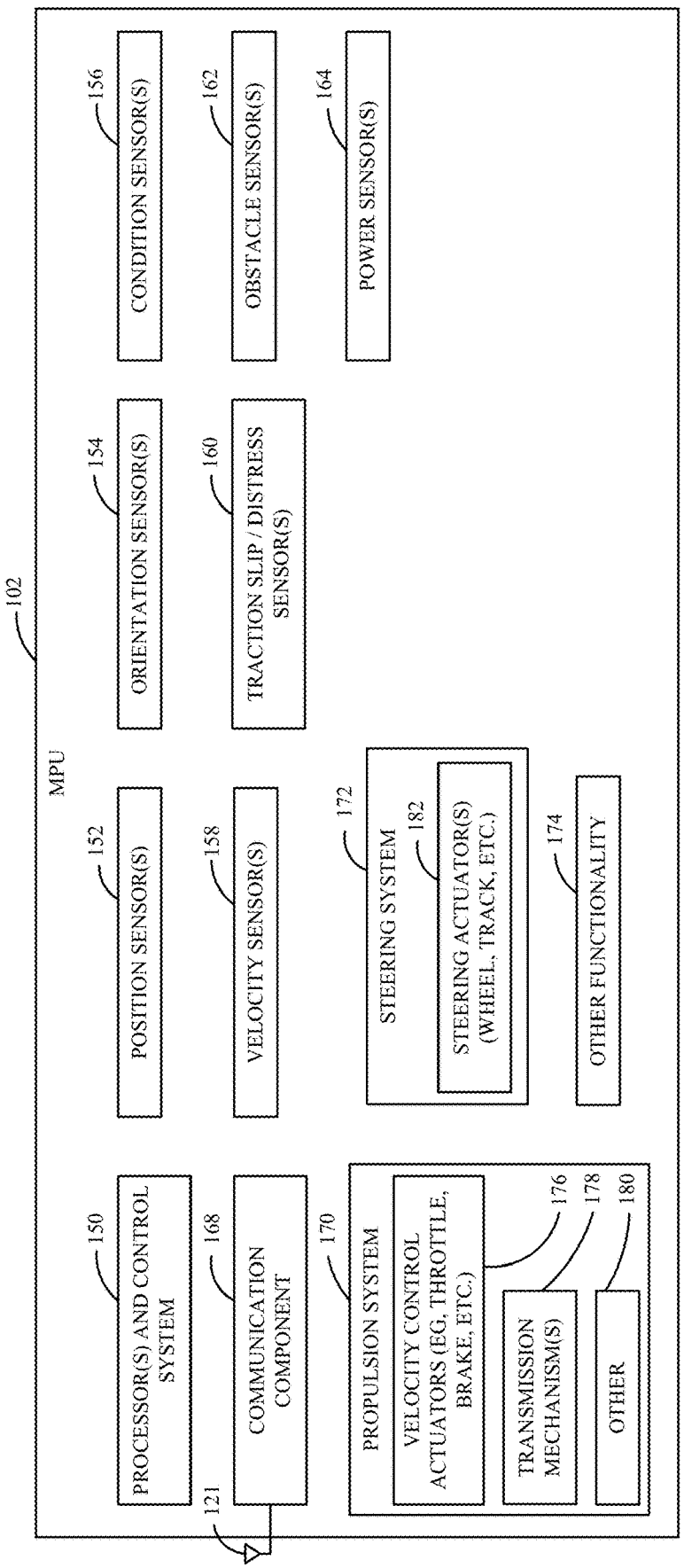
FIG. 2B is a block diagram showing one example of an MPU, in more detail.

FIG. 2B shows one example of portions of MPU 102, in more detail. It will be appreciated that MPU 104 can be similar to, or different from, MPU 102. For the sake of the present discussion, only an example of one MPU 102 will be provided. In the example shown in FIG. 2B, MPU 102 illustratively includes one or more processors in a corresponding control system 150, and one or more geographic position sensors 152, orientation sensors 154, condition sensors 156, and velocity sensors 158. MPU 102 can also include one or more traction slip/distress sensors 160, obstacle sensors 162, power output sensors 164, and any of a variety of other sensors 166. In addition, MPU 102 can include communication component 168, propulsion system 170, steering system 172, and it can include a wide variety of other functionality 174. In the example shown, propulsion system 170 illustratively includes velocity control actuators 176 (which may include a throttle, a brake, etc.) and transmission mechanisms 178. Transmission mechanisms 178 may be individual transmission mechanisms for driving each wheel of MPU 102, or it may be a transmission in which only a single set of wheels are driven at a time, or in which all four wheels are driven, or any combination thereof. Propulsion system 170 can include other items 180 as well.

Steering system 172 illustratively includes a set of steering actuators 182. Actuators 182 can, for instance, include actuators for steering the wheels (individually, in sets, or all four in coordination with one another) or actuators for steering the MPU using tracks (such as skid steer actuators), among others.

Geographic position sensors 152 can include a wide variety of different sensors that sense the geographic position of MPU 102. For instance, they can include a global navigation satellite system (such as a GPS) receiver, cellular triangulation position sensors, or a wide variety of other position sensors. Orientation sensors 154 can also include a wide variety of different types of sensors, such as accelerometers, or other sensors that provide a signal indicative of an orientation (such as pitch/roll, yaw, etc.) of MPU 102. Velocity sensors 158 illustratively sense a velocity of MPU 102 over the ground. Condition sensors 156 illustratively sense various conditions in the environment of MPU 102 that may affect traction. For instance, they may include moisture sensors that sense the presence of mud, water, ice, etc. Traction slip/distress sensors 160 illustratively sense whether the wheels on MPU 102 are slipping or being bogged down, so that MPU 102 is about to become stuck. Obstacle sensors 162 illustratively sense obstacles in the vicinity of MPU 102. They can include ultrasound sensors, radar or LIDAR sensors, image sensors and corresponding imaging processing to identify obstacles, mechanical touch sensors, etc. Power sensors 164 illustratively sense the power output being generated by MPU 102.

It will be noted that while the above sensors are provided for the sake of example only, they may not provide sensor signals that directly measure the sensed variable. Instead, they may provide signals from which the sensed variable can be determined. They are described herein as sensors for the sake of example only.

Communication component 168 can illustratively communicate with various other items in configuration 100 or with remote items. It can include a wireless communication component or one that communicates over a wired transmission link such as a CAN bus. A variety of these different types of communication systems are described in greater detail below. Where the communication component 168 provides wireless communication, it illustratively includes an antenna, such as antenna 121 illustrated in FIG. 2A above.

Figure 3:
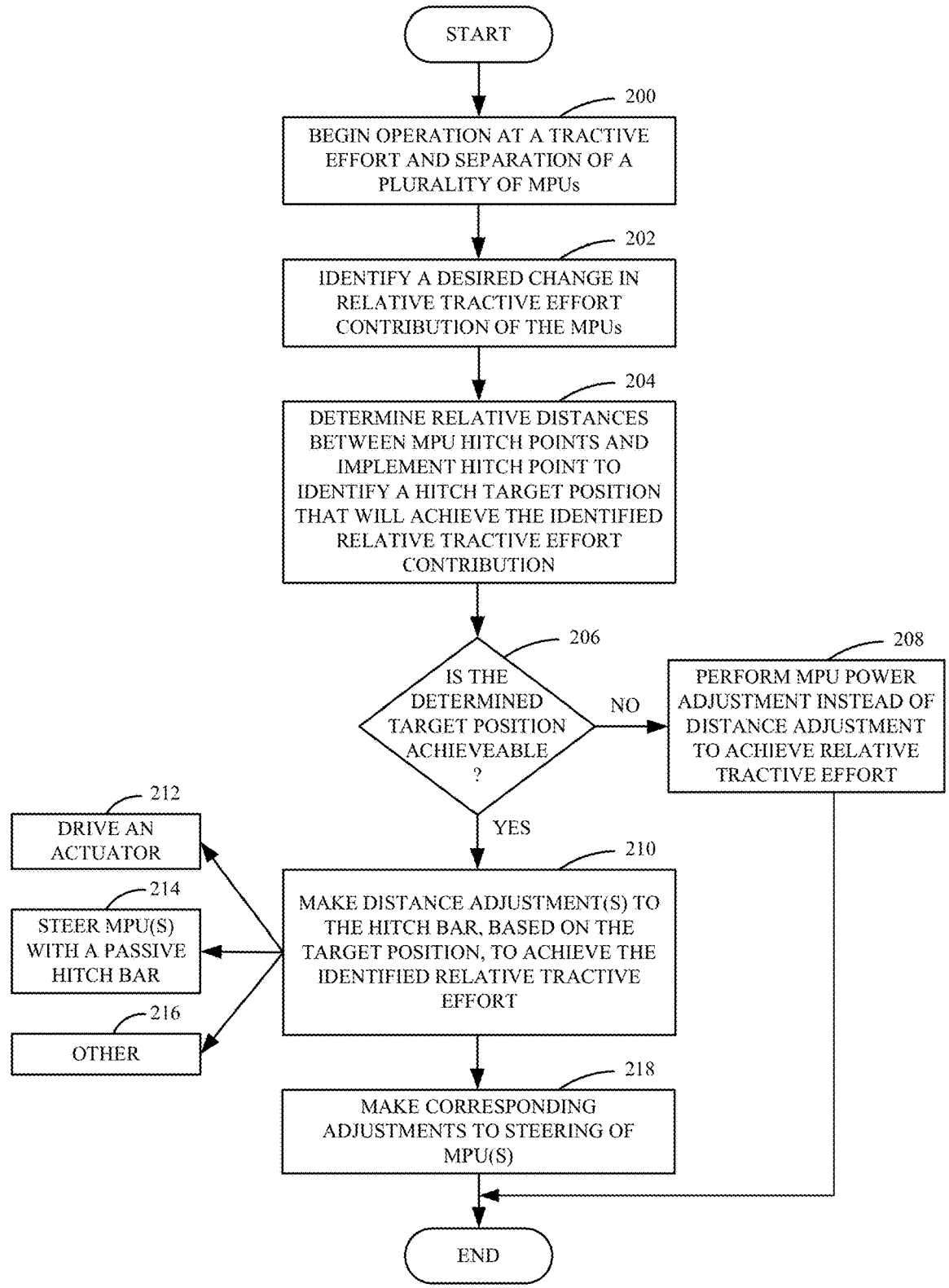
FIG. 3 is a flow diagram illustrating one example of the operation of the configuration illustrated in FIG. 1, in adjusting a length of the hitch bar to achieve a desired, relative tractive effort among the MPUs.

FIG. 3 is a flow diagram illustrating one example of the operation of configuration 100, in adjusting the length of hitch bar 110 in order to obtain a desired tractive effort contribution of each of the MPUs 102 and 104, in towing implement 106. Again, it will be noted that by varying the length of hitch bar portion 126 or 128, the tractive effort contribution of the corresponding MPU 102 or 104, respectively, will be modified.

Therefore, it is first assumed that MPUs 102 and 104 are operating and are towing implement 106. This is indicated by block 200 in FIG. 3. At some point, a component in the configuration identifies a desired change in the relative tractive effort contribution of the two MPUs 102 and 104. This is indicated by block 202, and it may be for a wide variety of different reasons. For instance, it may be that one of the MPUs operates in a more fuel efficient manner than the other. In that case, it may be desirable to increase the tractive effort contribution of the more efficient MPU, to run the entire configuration more efficiently. In another scenario, the MPUs in configuration 100 are about to make a turn in an agricultural field. In that case, it may be desirable to vary the tractive effort contribution of the two MPUs in order to accommodate the turn in the most affective manner, or in the smoothest way, etc.

As one example, for instance, assume that processor and control system 150 on MPU 102 determines that the tractive contribution of MPU 104 should be decreased. Thus, processor and control system 150 calculates the relative difference between the MPU hitch points 114, 116 and the corresponding implement hitch point 112 in order to obtain the relative tractive effort contribution that is now desired. For instance, the processor will determine that the distance from implement hitch point 112 to MPU hitch point 116 should be double that of the distance between implement hitch point 112 and MPU hitch point 114. With these relative distances between implement hitch point 112 and the two MPU hitch points 114 and 116, the identified relative tractive effort contribution of the two MPUs will be achieved. Determining these relative distances (e.g., the target position of hitch bar 110) is indicated by block 204 in FIG. 3.

It may be that, under certain circumstances, the desired distances cannot be achieved. For instance, it may be that one of the extending portions 130 or 136 is already fully extended. In another example, it may be that the corresponding MPU will not be able to steer further from implement hitch point 112 than it already is (for instance, it may not be able to steer in that way without steering over the top of crops). In any case, it is determined whether the target position for the extension of hitch bar 110 can be achieved. This is indicated by block 206 in FIG. 3. If not, then the tractive contribution may be adjusted in another way, such as by adjusting the power output by one or both of the MPUs, instead of adjusting the length of hitch bar 110. This is indicated by block 208 in FIG. 3.

However, if, at block 206, it is determined that the target position for the hitch bar 110 is achievable, then the adjustment to hitch bar 110 is made in order to achieve the identified relative tractive effort for the two MPUs. This is indicated by block 210. In one example, processor 150 communicates the target position of the hitch bar 110 to controller 148. Controller 148 controls the corresponding actuator 140, based upon the target position, in order to extend extending portion 136 until position sensor 144 indicates that it is at the target position. Controlling actuator 140 in order to move the desired portion of hitch bar 110 is indicated by block 212.

The distance adjustment can be made in other ways as well. For instance, where hitch bar 110 does not have any actuators on it, but is instead a passive hitch bar, then instead of driving an actuator to extend the hitch bar (with perhaps a spring biasing it into a retracted position), the corresponding MPU can be steered inwardly or outwardly until the hitch bar is at the target position. Steering the MPUs with a passive hitch bar to make the distance adjustment is made by block 214. The distance adjustment can be made in other ways as well, as indicated by block 216.

In addition, if the hitch bar 110 is dynamically moved using an actuator 134 or 140, then MPU 104 will be steered in a corresponding manner to accommodate for the dynamic movement of hitch bar 110. For instance, if extending portion 136 is extended to increase the distance between implement hitch point 112 and hitch point 116, then MPU 104 will be steered outwardly relative to hitch point 112, in a corresponding manner (or MPU 102 will be steered outwardly, or both MPUs 102 and 104 will be steered to increase their separation). Making corresponding adjustments to the steering of the MPUs 102 and 104 is indicated by block 218 in FIG. 3.

Figure 4:
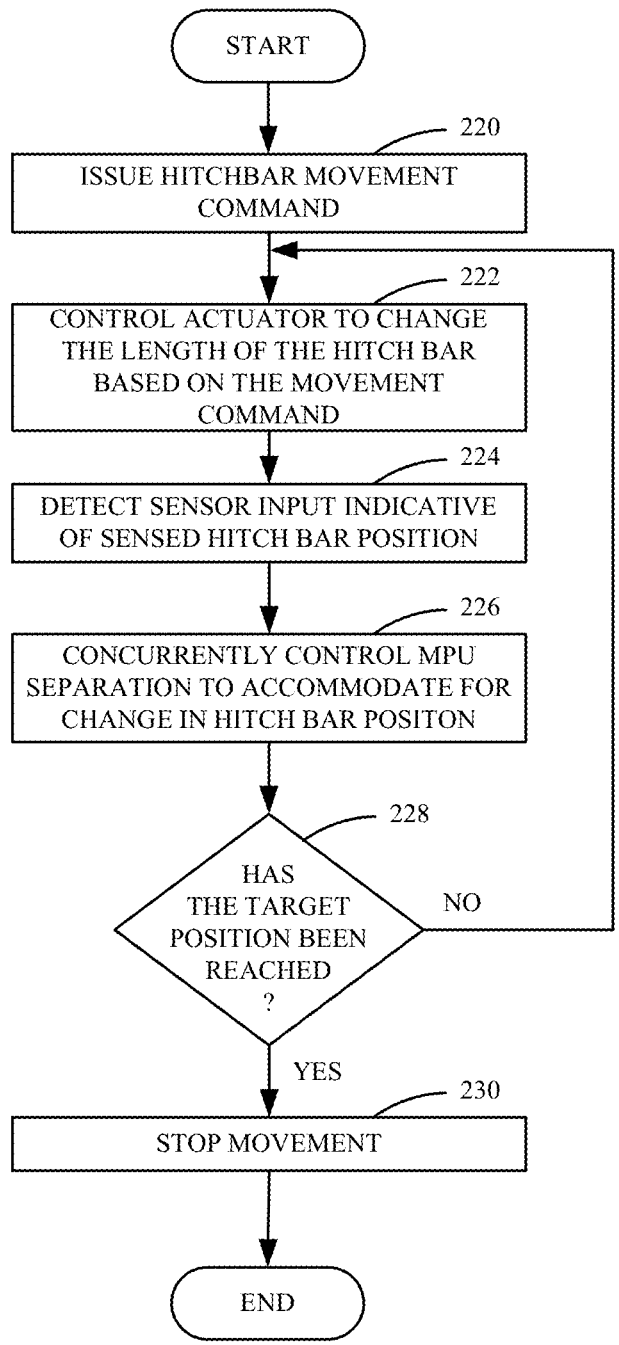
FIG. 4 is a flow diagram illustrating one example of controlling hitch bar actuators to vary the length of the hitch bar and to concurrently control movement of the MPUs.

FIG. 4 is a flow diagram illustrating one example of the operation of configuration 100 in controlling actuator 140 to extend extending member 136, in more detail. It is first assumed that, as described above with respect to FIG. 3, processor 150 (or a different processor in configuration 100) has issued a hitch bar movement command to controller 148 indicating that the distance between implement hitch point 112 and MPU hitch point 116 should be doubled. This is indicated by block 220 in FIG. 4. Controller 148 illustratively provides a control signal to actuator 140 (which may, for instance, be a hydraulic valve) to change the length of the hitch bar based upon the movement command. In the present scenario, this control signal will indicate that actuator 140 is to drive extending portion 136 so that it extends outwardly from within fixed portion 138. Controlling the actuator to change the length of the hitch bar based upon the movement command is indicated by block 222 in FIG. 4.

Controller 148 will then receive a position sensor signals from position sensor 144, that is indicative of the position of extending portion 136, within fixed portion 138. Detecting the sensed hitch bar position is indicated by block 224 in FIG. 4.

The position sensor signal from position sensor 144 will indicate that extending portion 136 is extending from within fixed portion 138. Therefore, the separation between the two MPUs 102 and 104 will be concurrently controlled to accommodate the change in the hitch bar position. This is indicated by block 226. In one example, for instance, MPU 104 has a processor 150, similar to that shown in FIG. 2B for MPU 102. The processor 150 illustratively receives the signal indicating that the hitch bar 110 is extending and controls the steering actuators 182 in MPU 104 to steer MPU 104 away from implement hitch point 112 at the same time and at the same rate that extending portion 136 is extending away from implement hitch point 112. Alternatively, of course, MPU 102 can steer away from hitch point 112 to accommodate the extension of extending portion 136 within fixed portion 138, as well. All of these examples are contemplated herein.

This continues, with controller 148 controlling actuator 140 to continue extending the extending portion 136 and with separation between MPUs 102 and 104 being concurrently controlled, until the target position for hitch bar 110 has been reached. In that case, position sensor 144 will provide a position signal to controller 148 indicating that extending portion 136 is at the target position. This is indicated by block 228 in FIG. 4. Once this occurs, then controller 148 illustratively controls actuator 140 to stop extending the extending portion 136. This is indicated by block 230. The corresponding tractive effort of the two MPUs will have now been adjusted to the desired relative contributions (or ratio), based upon the change in length of hitch bar 110 (and particularly of hitch bar portion 128).

Figure 5:
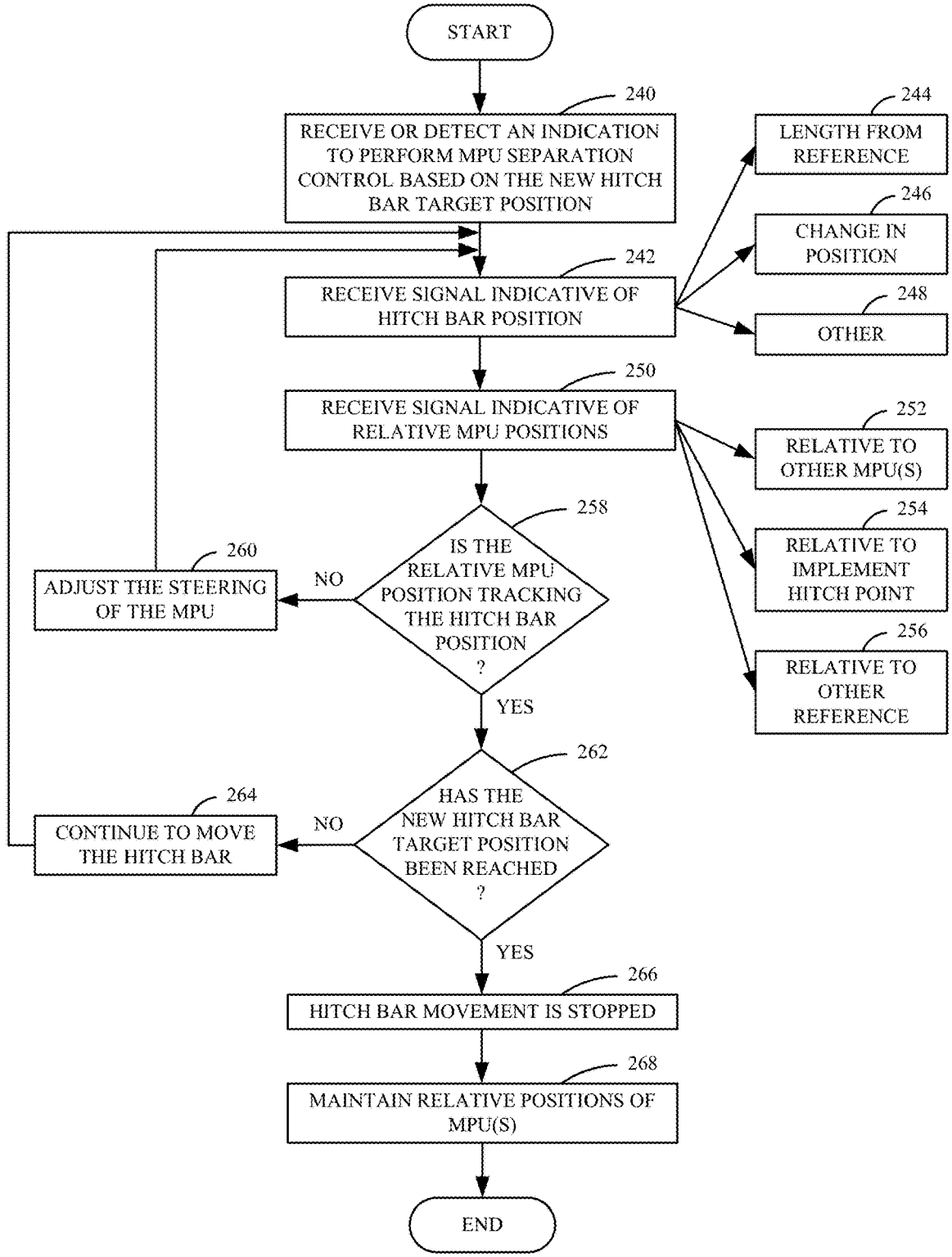
FIG. 5 is a flow diagram illustrating one example of controlling position of the MPUs, based on a change in the position of the hitch bar, in more detail.

FIG. 5 is a flow diagram illustrating the operation of architecture 100 illustrating one example of how the separation between MPUs 102 and 104 is controlled, given a change in the hitch bar position (as illustrated by block 218 in FIG. 3) in more detail. First, a processor (such as a processor in either MPU 102 or 104 or a different processor) receives or calculates an indication that MPU separation control is to be performed based on a new hitch bar target position (e.g., based on the fact that the hitch bar position is changing or is going to change). This is indicated by block 240 in FIG. 5. The processor then receives a signal indicative of the hitch bar position. This is indicated by block 242. For instance, it can receive a signal indicating the length of the hitch bar relative to a reference point (such as the length of hitch bar 110 between MPU hitch point 116 and implement hitch point 112). This is indicated by block 244. It can receive a signal that is indicative of a change in position (such as that the length of the hitch bar 110 is increasing or is going to increase). This is indicated by block 246. The signal indicative of hitch bar position can be a variety of other signals as well, and this is indicated by block 248.

The controller then receives a signal indicative of the relative MPU positions in the configuration 100. This is indicated by block 250. For instance, where the processor is on one of the MPUs 102 and 104, it may receive an input indicating its position relative to the other MPUs in the configuration 100. This is indicated by block 252. It may receive the signal indicative of its position relative to the implement hitch point 112. This is indicated by block 254. It may receive the signal indicative of its position relative to some other known reference point, as indicated by block 256.

In any case, processor 150 then compares the two signals to determine whether the relative position of the MPU 102 or 104 (or both) is tracking the current position (e.g., length) of the hitch bar 110. This is indicated by block 258. If not, it adjusts the steering of MPU 102 or 104 to accommodate this. This is indicated by block 260. For instance, if the two position signals indicate that the relative position of MPU 104 needs to change so that it is further from MPU 102 (or from implement hitch point 112 or another reference point), for instance, then processor 150 provides a control signal to steering actuators 182 in steering system 172 to steer MPU 104 in that direction. Processing then reverts to block 242 where the process is repeated.

If, at block 258, it is determined that the relative MPU position is tracking the hitch bar position, then the processor 150 determines whether the new hitch bar target position has been reached. This is indicated by block 262. This can be done, for instance, by comparing the target position to the position indicated by the position sensors, or by receiving a notification that the target position has been reached from another processor in configuration 100, or in other ways. If not, then the movement of the hitch bar 110 continues until it reaches the target position. This is indicated by block 264, and processing reverts to block 242.

However, if, at block 262, it is determined that the hitch bar target position has been reached, then hitch bar movement is stopped, as indicated by block 266, and the current relative positions of the MPUs are maintained. This is indicated by block 268. This will cause the two MPUs 102 and 104 to continue moving in parallel, relative to one another, with the desired tractive effort contributions.

Figure 6:
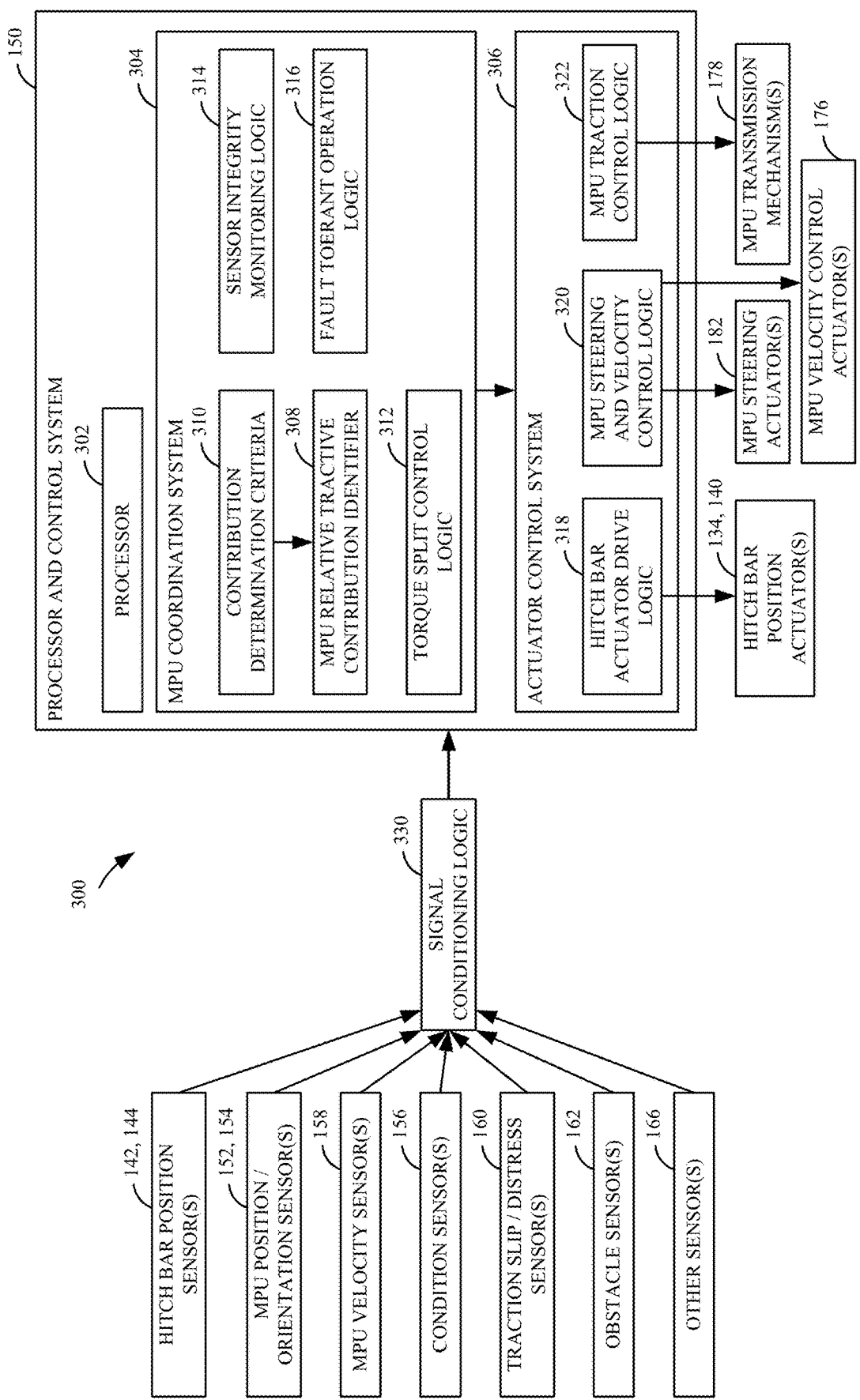
FIG. 6 is a block diagram of one example of an MPU control system architecture used in performing coordinated operation of multiple MPUs.

FIG. 6 is a block diagram of one example of a control system architecture 300 that can be used to control coordination between two or more MPUs (such as MPUs 102 and 104) in various scenarios. Some of the items are similar to those shown above with respect to previous figures, and are similarly numbered. Architecture 100 illustratively shows one example of processor and control system 150 in more detail. Processor and control system 150 illustratively includes processor 302, MPU coordination system 304, and actuator control system 306. MPU coordination system 304 illustratively includes MPU relative tractive contribution identifier 308 that receives one or more contribution determination criteria 310. System 304 also illustratively includes torque spilt control logic 312, sensor integrity monitoring logic 314, and fault tolerant operation logic 316.

Actuator control system 306 illustratively includes hitch bar actuator drive logic 318, MPU steering and velocity control logic 320, and MPU traction control logic 322. Processor and control system 150 is shown receiving input from a wide variety of different sensors (which were discussed above with respect to FIG. 2B) through signal conditioning logic 330. Signal conditioning logic 330 may include logic to perform such things as amplification, normalization, linearization, and a variety of other signal conditioning functions. It illustratively conditions the various sensor signals and provides them to system 150.

MPU relative tractive contribution identifier 308 receives one or more of the sensor signals and identifies a relative tractive contribution that should be attributed to each of the MPUs in the architecture. It can do this based on contribution determination criteria 310. For instance, the criteria 310 may include fuel efficiency criteria so MPU relative tractive contribution identifier 308 may identify the relative tractive contributions of the various MPUs in the system in order to optimize fuel efficiency. Therefore, if one of the MPUs has better fuel efficiency than the others, then identifier 308 may preferentially increase the tractive contribution of the more efficient MPU. If the criteria 310 are to maximize speed of the operation, then the MPU with the highest power capacity may be preferentially attributed a larger tractive effort contribution so that the overall speed of the operation can be increased. These are only examples of different tractive contribution criteria and a wide variety of others could be used as well.

In addition, and as will be described in greater detail below, various scenarios may occur in which case MPU relative tractive contribution identifier 308 intermittently increases or decreases the tractive contribution of one or more of the MPUs relative to the others, based upon sensed conditions. For instance, if one of the MPUs is slipping or in poor traction conditions (as sensed by condition sensor(s) 156), then identifier 308 may increase the tractive contribution of the other MPU until the traction conditions improve for the MPU that was slipping. This is an example only, and a wide variety of others may be used, and some additional scenarios where this occurs will be described below.

Torque split control logic 312 can illustratively split the torque assigned to the different axels of the MPUs or the different individual wheels, where they are independently drivable. For instance, if one set of wheels, or even one wheel, has poor traction conditions, logic 312 may preferentially split the torque to the other wheels to increase the overall tractive contribution of that MPU.

Sensor integrity monitoring logic 314 illustratively uses the sensor signals from the various sensors to ensure that the various sensors are operating properly. For instance, if obstacle sensor 162 is provided on MPU 102, and it senses the presence of MPU 104 to its left, but the same obstacle sensor on MPU 104 does not sense the presence of MPU 102 to its right, that indicates that the obstacle sensor on MPU 104 is malfunctioning. An alert message can be generated to an operator or a remote technician or otherwise to indicate this. This can be done with many other sensor inputs as well.

Fault tolerant operation logic 316 illustratively facilitates the operation of the in a fault tolerant way. For instance, some sensors may have overlapping fields of view. If it is determined that one of the sensors is malfunctioning, but a variety of the other sensors can cover the same field of view, then a notification of the malfunctioning sensor can be sent, but the architecture can continue in operation, until the malfunctioning sensor can be replaced. These are examples only.

Hitch bar actuator drive logic 318 illustratively provides a control signal to hitch bar position actuators 134, 140 to drive the actuators to change their positions. MPU steering and velocity control logic 320 illustratively generates a control signal and provides it to MPU steering actuators and MPU velocity control actuators 176 to control the steering and velocity of the corresponding MPUs. MPU traction control logic 322 illustratively provides an output to MPU transmission mechanisms 178 to control the traction mechanisms on the MPUs.

Figure 7:
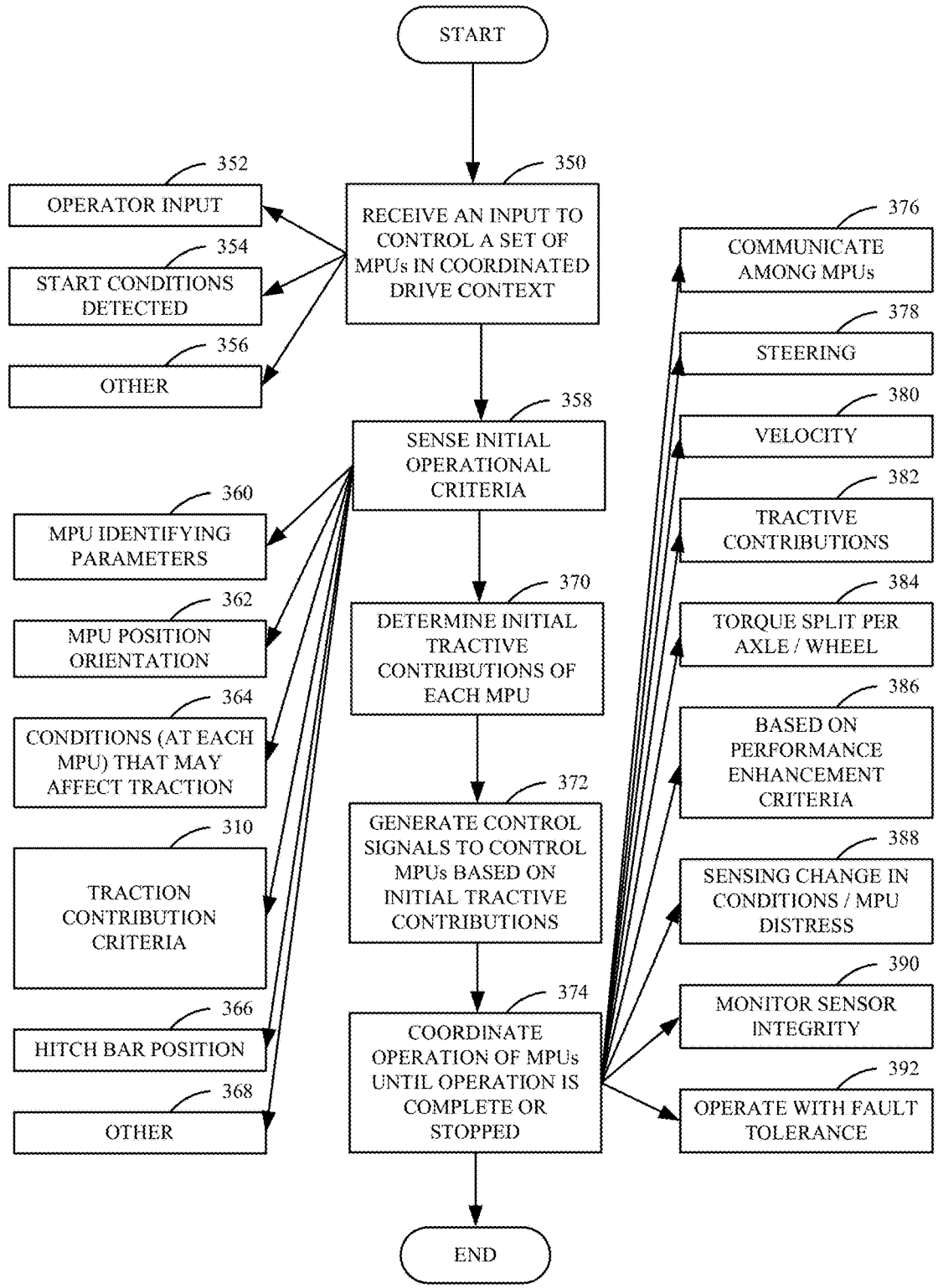
FIG. 7 is a flow diagram illustrating one example of the operation of the architecture shown in FIG. 6, in various scenarios.

FIG. 7 is a flow diagram illustrating one example of the operation of architecture 300 in coordinating the operation of MPUs 102 and 104, in a variety of different scenarios. Again, for the sake of the description in FIG. 7, it is assumed that control system 150 is in MPU 102. It could just as easily, however, be in MPU 104, be in a remote location, be on hitch bar 110 or implement 106, or be distributed among those items, having various elements distributed thereabout.

In any case, processor 302 first receives an input to control the set of MPUs 102 and 104 in coordinated drive context. This is indicated by block 350 in FIG. 7. In one example, where at least one of the MPUs has a manual operator, this can be a manual input indicating that the operation is to begin. This is indicated by block 352. It can also a sensed input in which other start conditions are detected. This is indicated by block 354. The input can take a variety of other forms as well, and this is indicated by block 356.

MPU relative tractive contribution identifier 308 then senses a set of initial operational criteria that it uses to determine the initial tractive contributions of each MPU in the system. This is indicated by block 358. For instance, it can sense MPU identifying parameters 360 which indicate the tractive power capacities of the MPUs (e.g., their power ratings), the particular machines that are being used as the MPUs, the steering and transmission characteristics of the MPUs (such as whether the wheels are individually steerable and drivable), or a wide variety of other MPU identifying parameters. It can also sense the initial MPU position and orientation from position and orientation sensors 152, and 154. This is indicated by block 362. It can also sense the various conditions at each of the MPUs that may affect traction. This is indicated by block 364. For instance, it can sense the soil moisture, the weather, ice conditions, or a variety of other conditions that may affect the traction of each of the MPUs. It can sense or otherwise obtain the traction contribution performance criteria 310. As mentioned above, the criteria can be fuel efficiency criteria, speed, power efficiency, etc. It can also sense the initial hitch bar positions from hitch bar position sensors 142 and 144. This is indicated by block 366. It can sense a wide variety of other initial operational criteria or conditions as well, and this is indicated by block 368. MPU relative tractive contribution identifier 308 then determines an initial relative tractive contribution for each of the MPUs 102 and 104 in the system. This is indicated by block 370. For instance, if both MPUs have equal tractive power capacity, and the conditions are the same for both, then it may attribute the same tractive power contribution to each of the MPUs. On the other hand, if one of the MPUs is smaller, then it may attribute less tractive effort contribution to that MPU and more to the larger MPU. All of these are examples.

It provides an output indicative of the tractive contribution to actuator control system 306 which generates control signals to control the MPUs based upon the initial tractive contributions. This is indicated by block 372. For instance, hitch bar actuator drive logic 318 controls hitch bar position actuators 134 and 140 so that they assume a target position which will result in the initial tractive effort contribution for the different MPUs indicated by identifier 308. If it needs to control one or more actuators to increase the length of a portion of the hitch bar, it will do so. Alternatively, if it needs to control one or more actuators to decrease a length of a portion of the hitch bar, it will do that. It will drive the actuator to its target position as described above with respect to FIG. 4. If the hitch bar 110 does not have actuators, but is instead a passive hitch bar, then it will control the steering of the MPUs so that the length of the segments of the MPUs is adjusted properly. Alternatively, or in addition, it can control the power output by the MPUs to obtain the initial tractive contribution for each MPU.

Once the relative tractive contributions have been assigned to each of the MPUs, then MPU coordination system 304 coordinates the operation of the MPUs throughout the operation of the MPUs, until the operation is complete, or until it stops for some other reason. This is indicated by block 374.

In doing so, MPU coordination system 304 can use communication component 168 to communicate with the other MPUs in the architecture. This is indicated by block 376. It can control the steering of its own MPU, or that of the other MPUs as well. This is indicated by block 378. It can control the velocity of the MPUs as indicated by block 380 and it can dynamically control the tractive contributions of the MPUs in an ongoing way, as indicated by block 382.

As discussed above, torque split control logic 312 can control the torque split on a per-axel, or even on a per-wheel basis, for the various MPUs in the architecture. This is indicated by block 384.

The operation of the MPUs can be coordinated based on the performance enhancement criteria 310. For instance, the coordinated operation can be controlled to optimize fuel efficiency, power efficiency, speed, or a wide variety of other criteria or different combinations of criteria. This is indicated by block 386. The coordination can be varied based upon changing conditions as sensed by condition sensors 156. For instance, if one of the MPUs is in mud or has less traction, then the MPUs can be controlled so that more tractive contribution is attributed to the other MPUs, that have more sure traction. Coordinating the MPUs based upon changes in sensed conditions is indicated by block 388.

Also, as described above, sensor integrity monitoring logic 314 can monitor sensor integrity as indicated by block 390. Appropriate messages can be generated to operators or technicians, in order to address problems with sensor integrity.

Fault tolerant operation logic 316 can also control the coordinated operation of the MPUs to operate with fault tolerance. This is indicated by block 392, and some examples of this were also mentioned above.

A number of things should also be noted. The hitch bar 110 has been described herein as being generally straight. However, the configuration of hitch bar 110 can also be varied widely. For instance, it may be V shaped, curved, or have any other desired shape. If, for example, it is V shaped, then the angle of the V may be adjustable. The adjustments may be made prior to, or during field work.

Further, the overall configuration 100 shown in FIG. 1 may take a variety of different forms. For instance, one of the MPUs may have a human operator that controls the direction of travel for the entire configuration from the steering input of that MPU. The second MPU then follows the lead in a leader-follower configuration. In another example, both MPUs are autonomous. One may be designated as the leader and all other MPUs may be designated as followers. This operation is similar to the manned scenario in which one of the MPUs is manned, except that there is no person on the leading machine. In another option, there is no full-time leader or follower designated, but instead that designation can change among the various MPUs. For instance, one MPU may have a default designation as the leader, during the initial startup of the process. However, another MPU may sense conditions (such as an obstacle) in which case that MPU can be designated as the leader and have authority to stop all of the other MPUs. The control system can implement appropriate timeouts to alleviate a condition in which multiple MPUs are issuing conflicting commands.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 8:
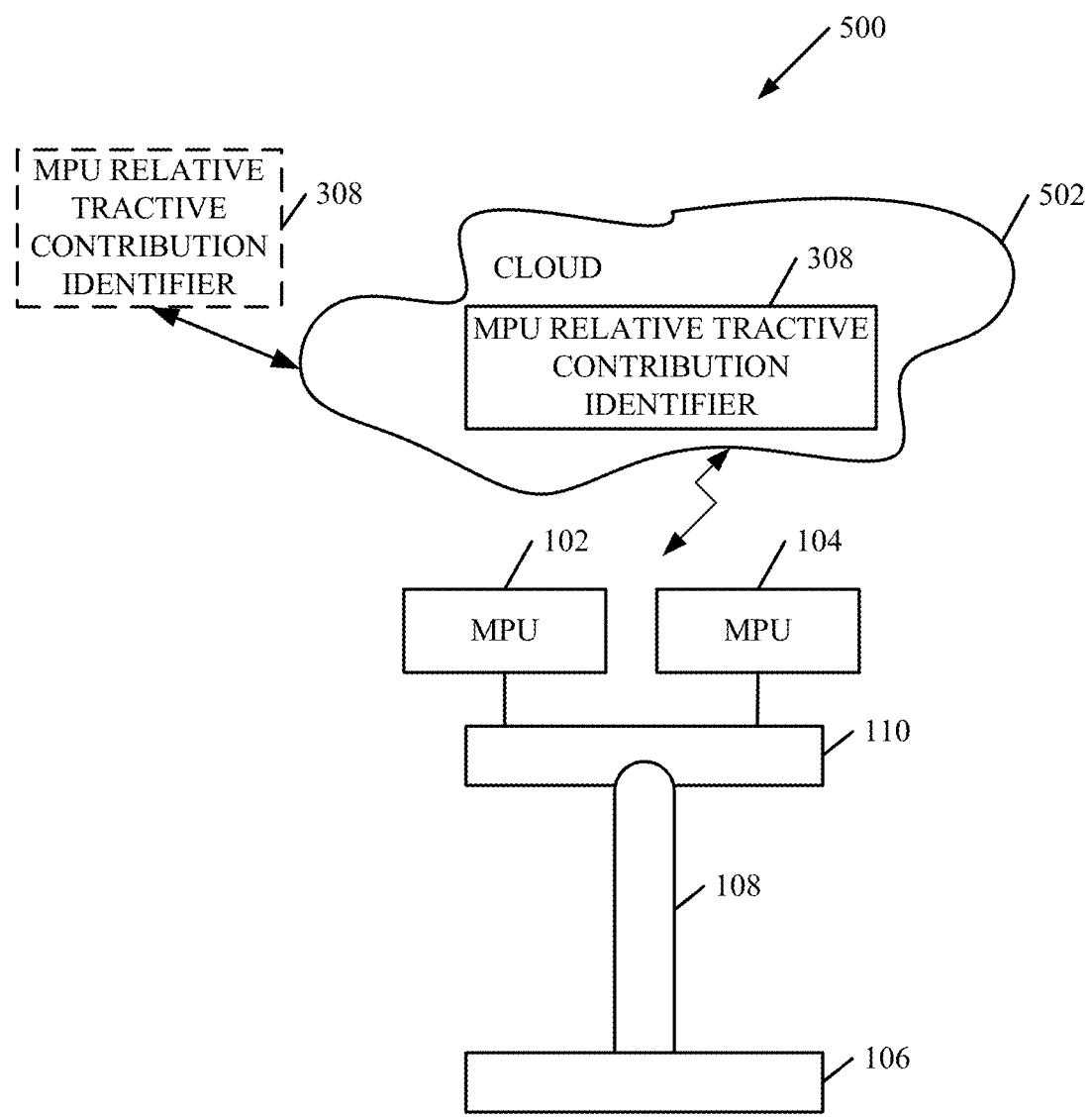
FIG. 8 is a block diagram of one example of the configuration shown in FIG. 6, deployed in a remote server environment.

FIG. 8 is a block diagram of configuration 100, shown in FIGS. 1, 2 and 6, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIGS. 1, 2 and 6 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIGS. 1, 2 and 6 and they are similarly numbered. FIG. 8 specifically shows that can be located at a remote server location 502. Therefore, items in configuration 100 access those systems through remote server location 502.

FIG. 8 also depicts another example of a remote server architecture. FIG. 8 shows that it is also contemplated that some elements of FIGS. 1, 2 and 6 are disposed at remote server location 502 while others are not. By way of example, identifier 308 can be disposed at a location separate from location 502, and accessed through the remote server at location 502. Regardless of where they are located, they can be accessed directly by items in configuration 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As an MPU or the hitch bar comes close to the fuel truck for fueling, the system automatically collects the information from the MPU using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the MPU until the MPU enters a covered location. The MPU, itself, can then send the information to the main network.

It will also be noted that the elements of FIGS. 1, 2 and 6, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
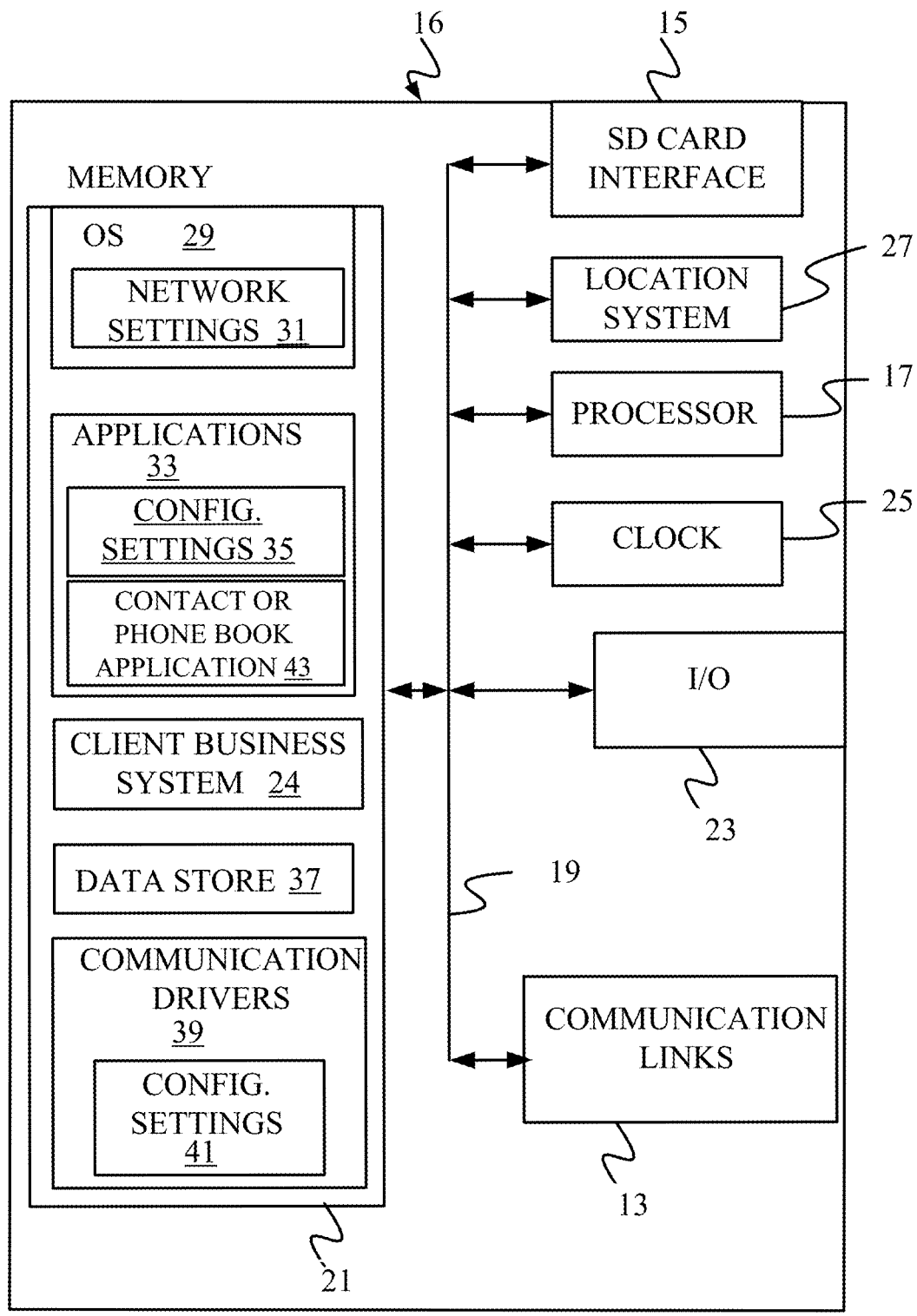
FIGS. 9-11 show examples of mobile devices that can be used in the architectures of the previous figures.
Figure 10:
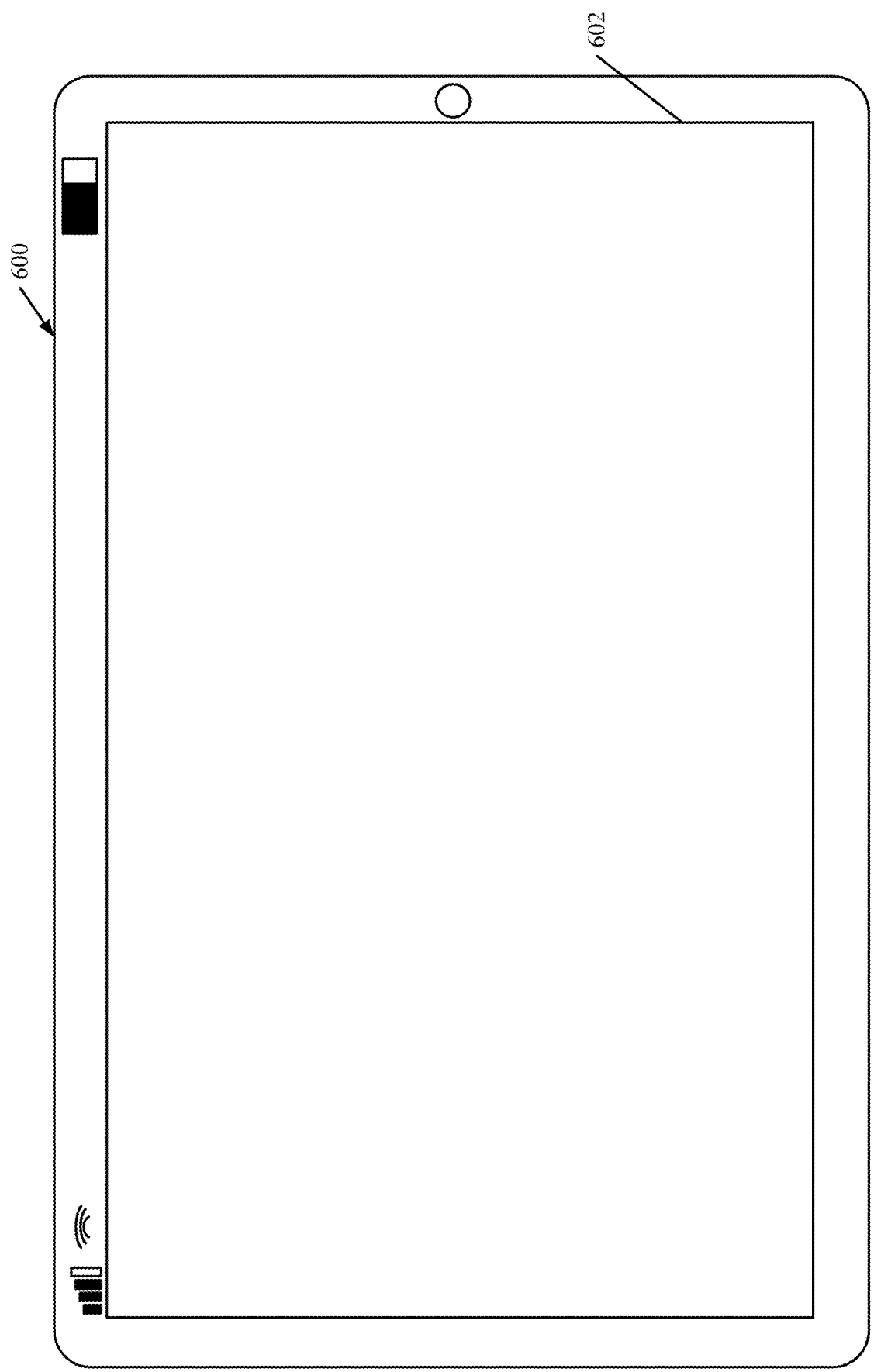
Figure 11:
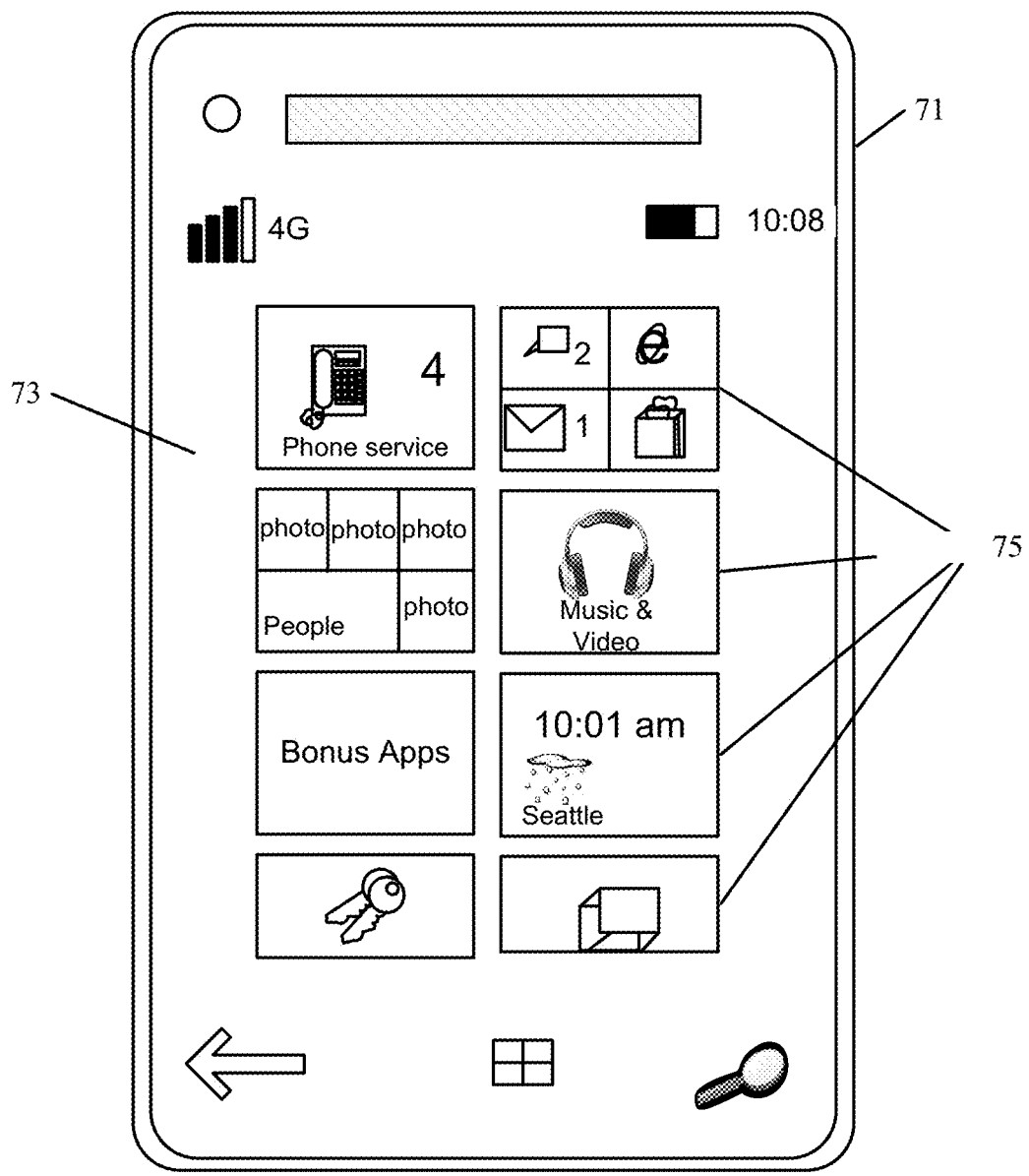

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of one of the MPUs in configuration 100 for use in generating, processing, or displaying the control signals. FIGS. 10-11 are examples of handheld or mobile devices.

FIG. 9 provides a general block diagram of the components of a client device 16 that can run some components shown in FIG. 1, 2 or 6, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other example, applications can be received on a removable Secure Digital (SD) card that is connected to an interface 15. Interface 15 and communication links 13 communicate with a processor 17 (which can also embody processors from FIG. 1, 2 or 6) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
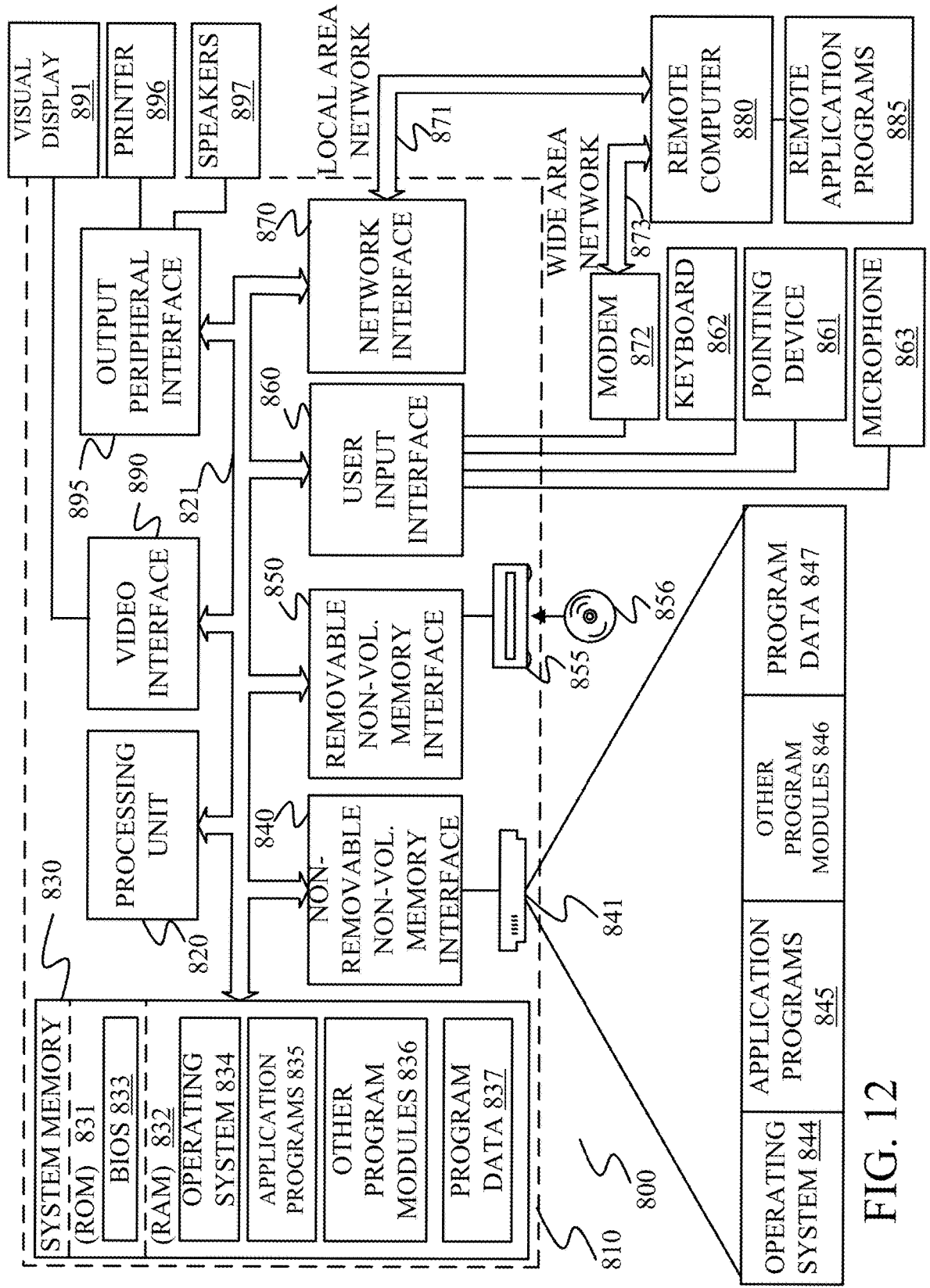
FIG. 12 is a block diagram of one example of a computing system environment which can be used in the architectures shown in the previous figures.

FIG. 12 is one example of a computing environment in which elements of FIG. 1, 2 or 6, or parts of them, (for example) can be deployed. With reference to FIG. 12, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1, 2 and 6 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal. The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a hitch assembly, comprising:
an implement hitch portion configured to couple an implement to the hitching assembly;
a first hitch bar portion, coupled to the implement hitch portion, that has a first modular power unit (MPU) connection portion configured for connection to a first MPU, the first hitch bar portion having a dynamically variable configuration that dynamically varies a length between the implement hitch portion and the first MPU connection portion;
a first hitch bar position sensor that generates a first position signal indicative of the length of the first hitch bar portion between the implement hitch portion and the first MPU connection portion;
a second hitch bar portion, coupled to the implement hitch portion, that has a second modular power unit (MPU) connection portion configured for connection to a second MPU, so the first and second MPUs are substantially connected in parallel with one another; and
a control system that receives the first position signal and generates a first target length control signal to control the length between the implement hitch portion and the first MPU connection portion based on a first hitch bar target length.

Example 2 is the hitch assembly of any or all previous examples wherein the control system comprises:
a relative tractive contribution identifier that identifies a target relative tractive contribution of the first and second MPUs and generates a target relative tractive contribution indicator indicative of the target relative tractive contribution.

Example 3 is the hitch assembly of any or all previous examples wherein the control system further comprises:
hitch bar actuator drive logic that receives the target relative tractive contribution indicator and identifies the first hitch bar target length based on the target relative tractive contribution indicator.

Example 4 is the hitch assembly of any or all previous examples and further comprising:
a first actuator, coupled to the first hitch bar portion and configured to receive the first target length control signal and drive variation in the length between the implement hitch portion and the first MPU connection portion based on the first target length control signal.

Example 5 is the hitch assembly of any or all previous examples wherein the first hitch bar portion comprises:
a first fixed portion; and
a first extendable portion and wherein the first actuator is coupled to drive movement of the first extendable portion relative to the first fixed portion.

Example 6 is the hitch assembly of any or all previous examples wherein the first hitch bar position sensor senses a position of the first extendable portion relative to the first fixed portion and generates the first position signal based on the sensed position.

Example 7 is the hitch assembly of any or all previous examples wherein the second hitch bar portion comprises:
a second fixed portion;
a second extendable portion; and
a second actuator coupled to drive movement of the second extendable portion relative to the second fixed portion.

Example 8 is the hitch assembly of any or all previous examples and further comprising:
a second hitch bar position sensor configured to sense a position of the second extendable portion relative to the second fixed portion and generate a second position signal based on the sensed position.

Example 9 is the hitch assembly of any or all previous examples wherein the hitch bar actuator drive logic receives the target relative tractive contribution indicator and identifies a second hitch bar target length based on the target relative tractive contribution indicator wherein the control system receives the second position signal and generates a second target length control signal to control the length between the implement hitch portion and the second MPU connection portion based on the second hitch bar target length.

Example 10 is the hitch assembly of any or all previous examples wherein the first target length control signal controls steering of one of the first and second MPUs relative to another one of the first and second MPUs so the first hitch bar portion moves to the first target length.

Example 11 is the hitch assembly of any or all previous examples wherein the control system is disposed on one of the first or second MPUs.

Example 12 is the hitch assembly of any or all previous examples wherein the control system is disposed remotely from the implement hitch portion and from the first and second hitch bar portions.

Example 13 is a method, comprising:
sensing a length of a first hitch bar portion on a hitch assembly, the first hitch bar portion having a first modular power unit (MPU) connection portion configured for connection to a first MPU and an implement hitch portion configured for connection to an implement, the first hitch bar portion having a dynamically variable configuration that dynamically varies the sensed length between the implement hitch portion and the first MPU connection portion, the hitch assembly further including a second hitch bar portion, coupled to the implement hitch portion, that has a second modular power unit (MPU) connection portion configured for connection to a second MPU, so the first and second MPUs are substantially connected in parallel with one another;

generating a first position signal indicative of the sensed length of the first hitch bar portion between the implement hitch portion and the first MPU connection portion; and generating a first target length control signal to control the sensed length between the implement hitch portion and the first MPU connection portion based on a first hitch bar target length and the first position signal.

Example 14 is the method of any or all previous examples wherein generating the first target length control signal comprises:

identifying a target relative tractive contribution of the first and second MPUs;

generating a target relative tractive contribution indicator indicative of the target relative tractive contribution; and identifying the first hitch bar target length based on the target relative tractive contribution indicator.

Example 15 is the method of any or all previous examples and further comprising:

providing the first target length control signal to a first actuator, coupled to the first hitch bar portion; and driving variation in the length between the implement hitch portion and the first MPU connection portion, with the first actuator, based on the first target length control signal.

Example 16 is the method of any or all previous examples wherein the first hitch bar portion includes a first fixed portion, and a first extendable portion and wherein driving variation comprises:

driving movement of the first extendable portion relative to the first fixed portion.

Example 17 is the method of any or all previous examples wherein sensing the length of the first hitch bar portion comprises:

sensing a position of the first extendable portion relative to the first fixed portion and wherein generating the first position signal comprises generating the first position signal based on the sensed position.

Example 18 is the method of any or all previous examples wherein generating the first target length control signal to control the sensed length comprises:

controlling steering of one of the first and second MPUs relative to another one of the first and second MPUs so the first hitch bar portion moves to the first target length.

Example 19 is a hitch architecture, comprising:
a hitch bar assembly, comprising:
an implement hitch portion configured to couple an implement to the hitch bar assembly;

a first hitch bar portion, coupled to the implement hitch portion, that has a first modular power unit (MPU) connection portion configured for connection to a first MPU, the first hitch bar portion having a dynamically variable configuration that dynamically varies a length between the implement hitch portion and the first MPU connection portion;

a first hitch bar position sensor that generates a first position signal indicative of the length of the first hitch bar portion between the implement hitch portion and the first MPU connection portion; and a second hitch bar portion, coupled to the implement hitch portion, that has a second modular power unit (MPU) connection portion configured for connection to a second MPU, so the first and second MPUs are substantially connected in parallel with one another;

a relative tractive contribution identifier that identifies a target relative tractive contribution of the first and second MPUs and generates a target relative tractive contribution indicator indicative of the target relative tractive contribution; and a control system that receives the first position signal and the target relative tractive contribution indicator and generates a first hitch bar target length based on the target relative tractive contribution indicator and generates a first target length control signal to control the length between the implement hitch portion and the first MPU connection portion based on a first hitch bar target length and the first position signal.

Example 20 is the hitch architecture of any or all previous examples wherein the first hitch bar includes a first fixed portion and a first extendable portion and wherein the hitch bar assembly further comprises:

a first actuator, coupled to the first hitch bar portion and configured to receive the first target length control signal and drive variation in the length between the implement hitch portion and the first MPU connection portion based on the first target length control signal by driving movement of the first extendable portion relative to the first fixed portion.

Example 21 is a control system architecture, comprising:
a hitch bar assembly that has a first hitch bar portion disposed between an implement hitch portion and a first modular power unit (MPU) hitch portion and a second hitch bar portion disposed between the implement hitch portion and a second MPU hitch portion;

a position sensor that senses a position of the first hitch bar portion and generates a first position signal indicative of the sensed position; and a control system that receives the first position signal and dynamically controls the length of the first hitch bar portion based on a target tractive contribution corresponding to the first and second MPUs.

Example 22 is the control system architecture of any or all previous examples wherein the control system further comprises:

MPU steering logic that dynamically controls steering of at least one of the first or second MPUs based on the dynamically controlled length of the first hitch bar portion.

Example 23 is the control system architecture of any or all previous examples wherein the control system comprises:

a relative tractive contribution identifier that accesses contribution determination criteria and identifies the target tractive contribution corresponding to the first and second MPUs based on the contribution determination criteria.

Example 24 is the control system architecture of any or all previous examples wherein the first and second MPUs have different tractive effort capacities and wherein the relative tractive contribution identifies the target tractive contribution corresponding to the first and second MPUs based on the tractive effort capacities of the first and second MPUs.

Example 25 is the control system architecture of any or all previous examples wherein the first and second MPUs have different characteristics relative to the contribution determination criteria and wherein the relative tractive contribution identifies the target tractive contribution corresponding to the first and second MPUs based on the characteristics of the MPUs and the contribution determination criteria.

Example 26 is the control system architecture of any or all previous examples wherein the first and second MPUs have different fuel efficiency characteristics and wherein the contribution determination criteria include a fuel efficiency criterion, the relative tractive contribution identifier identifying the target tractive contribution corresponding to the first and second MPUs based on the fuel efficiency characteristics of the first and second MPUs and based on the fuel efficiency criterion.

Example 27 is the control system architecture of any or all previous examples and further comprising:
a condition sensor that senses a condition relative to at least a given MPU, of the first and second MPUs, that affects the tractive force exerted by the given MPU, the relative tractive contribution identifier dynamically adjusting the target tractive contribution corresponding to the first and second MPUs based on the sensed condition, the control system dynamically adjusting the length of the first hitch bar portion based on the dynamically adjusted target tractive contribution.

Example 28 is the control system architecture of any or all previous examples wherein the condition sensor comprises:
a first traction slip sensor that senses traction slip on the first MPU and generates a first traction slip sensor signal based on the sensed traction slip; and
a second traction slip sensor that senses traction slip on the second MPU and generates a second traction slip sensor signal based on the sensed traction slip, the relative tractive contribution identifier preferentially identifying a higher target tractive contribution corresponding to the given MPU that has less traction slip, based on the first and second traction slip sensor signals.

Example 29 is the control system architecture of any or all previous examples wherein the first and second MPUs each have a corresponding set of ground engaging traction members that engage the ground and provide traction to the corresponding MPU and wherein the control system further comprises:
torque split control logic that generates a torque split control signal to control power applied to the ground engaging traction members in each set, based on the first and second traction slip sensor signals.

Example 30 is a method, comprising:
sensing a position of a first hitch bar portion disposed between an implement hitch portion and a first modular power unit (MPU) hitch portion on a hitch assembly, the hitch assembly including a second hitch bar portion disposed between the implement hitch portion and a second MPU hitch portion;
generates a first position signal indicative of the sensed position;
dynamically controlling the length of the first hitch bar portion based on a target tractive contribution corresponding to the first and second MPUs and based on the sensed position; and
dynamically coordinating operation of the first and second MPUs based on the dynamic control of the length of the first hitch bar portion.

Example 31 is the method of any or all previous examples wherein dynamically coordinating operation of the first and second MPUs comprises:
dynamically controlling steering of at least one of the first or second MPUs based on the dynamically controlled length of the first hitch bar portion.

Example 32 is the method of any or all previous examples wherein dynamically controlling the length of the first hitch bar portion comprises:

accessing contribution determination criteria; and
identifying the target tractive contribution corresponding to the first and second MPUs based on the contribution determination criteria.

Example 33 is the method of any or all previous examples wherein the first and second MPUs have different tractive effort capacities and wherein identifying the target tractive contribution comprises:
identifying the target tractive contribution corresponding to the first and second MPUs based on the tractive effort capacities of the first and second MPUs.

Example 34 is the method of any or all previous examples wherein the first and second MPUs have different characteristics relative to the contribution determination criteria and wherein identifying the target tractive contribution comprises:
identifying the target tractive contribution corresponding to the first and second MPUs based on the characteristics of the MPUs and the contribution determination criteria.

Example 35 is the method of any or all previous examples wherein the first and second MPUs have different fuel efficiency characteristics, wherein the contribution determination criteria include a fuel efficiency criterion, and wherein identifying the target tractive contribution comprises:
identifying the target tractive contribution corresponding to the first and second MPUs based on the fuel efficiency characteristics of the first and second MPUs and based on the fuel efficiency criterion.

Example 36 is the method of any or all previous examples wherein dynamically controlling the length of the first hitch bar portion comprises:
sensing a condition relative to at least a given MPU, of the first and second MPUs, that affects the tractive force exerted by the given MPU;
dynamically adjusting the target tractive contribution corresponding to the first and second MPUs based on the sensed condition; and
dynamically adjusting the length of the first hitch bar portion based on the dynamically adjusted target tractive contribution.

Example 37 is the method of any or all previous examples wherein sensing a condition comprises:
sensing traction slip on the first MPU;
generating a first traction slip sensor signal based on the sensed traction slip;
sensing traction slip on the second MPU; and
generating a second traction slip sensor signal based on the sensed traction slip, wherein identifying the target tractive contribution comprises preferentially identifying a higher target tractive contribution corresponding to the given MPU that has less traction slip, based on the first and second traction slip sensor signals.

Example 38 is the method of any or all previous examples wherein the first and second MPUs each have a corresponding set of ground engaging traction members that engage the ground and provide traction to the corresponding MPU and wherein identifying the target tractive contribution comprises:
generating a torque split control signal to control power applied to the ground engaging traction members in each set, based on the first and second traction slip sensor signals.

Example 39 is a control system, comprising:
a hitch bar assembly that has a first hitch bar portion disposed between an implement hitch portion and a first modular power unit (MPU) hitch portion and a second hitch bar portion disposed between the implement hitch portion and a second MPU hitch portion;
a position sensor that senses a position of the first hitch bar portion and generates a first position signal indicative of the sensed position; and
an MPU coordination system that identifies a target tractive contribution corresponding to the first and second MPUs and receives the first position signal and dynamically controls the length of the first hitch bar portion based on the target tractive contribution corresponding to the first and second MPUs and further controls steering of at least one of the first or second MPUs based on the dynamic control of the length of the first hitch bar portion.

Example 40 is the control system of any or all previous examples and further comprising:
a condition sensor that senses a condition relative to at least a given MPU, of the first and second MPUs, that affects the tractive force exerted by the given MPU, the MPU coordination system dynamically adjusting the target tractive contribution corresponding to the first and second MPUs based on the sensed condition, and dynamically adjusting the length of the first hitch bar portion based on the dynamically adjusted target tractive contribution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hitch assembly, comprising:
an implement hitch portion configured to couple an implement to the hitch assembly;
a first hitch bar portion, coupled to the implement hitch portion, that has a first modular power unit (MPU) connection portion configured for connection to a first MPU, the first hitch bar portion having a dynamically variable configuration that dynamically varies a length of the first hitch bar portion between the implement hitch portion and the first MPU connection portion;
a first hitch bar position sensor that generates a first position signal indicative of the length of the first hitch bar portion between the implement hitch portion and the first MPU connection portion;
a second hitch bar portion, coupled to the implement hitch portion, that has a second modular power unit (MPU) connection portion configured for connection to a second MPU, so the first and second MPUs are substantially connected in parallel with one another; and
a control system that receives the first position signal and generates a first target length control signal to control the dynamically variable configuration of the first hitch bar portion to dynamically vary the length of the first hitch bar portion to vary a distance between the first MPU connection portion and the second MPU connection portion based on the first position signal and a first hitch bar target length.

2. The hitch assembly of claim 1 wherein the control system comprises:
a relative tractive contribution identifier that identifies a target relative tractive contribution of the first and second MPUs and generates a target relative tractive contribution indicator indicative of the target relative tractive contribution.

3. The hitch assembly of claim 2 wherein the control system further comprises:
hitch bar actuator drive logic that receives the target relative tractive contribution indicator and identifies the first hitch bar target length based on the target relative tractive contribution indicator.

4. The hitch assembly of claim 3 and further comprising:
a first actuator, coupled to the first hitch bar portion and configured to receive the first target length control signal and drive variation in the length of the first hitch bar portion between the implement hitch portion and the first MPU connection portion based on the first target length control signal.

5. The hitch assembly of claim 4 wherein
the first hitch bar portion comprises:
a first fixed portion; and
a first extendable portion that is movable relative to the first fixed portion, and
the first actuator is coupled to drive movement of the first extendable portion, relative to the first fixed portion, to vary the length of the first hitch bar portion between the implement hitch portion and the first MPU connection portion.

6. The hitch assembly of claim 3 wherein
the first hitch bar position sensor senses a position of the first extendable portion relative to the first fixed portion and generates the first position signal based on the sensed position.

7. The hitch assembly of claim 6 wherein the second hitch bar portion comprises:
a second fixed portion;
a second extendable portion that is movable relative to the second fixed portion; and
a second actuator coupled to drive movement of the second extendable portion relative to the second fixed portion, to vary a length of the second hitch bar portion between the implement hitch portion and the second MPU connection portion.

8. The hitch assembly of claim 7 and further comprising:
a second hitch bar position sensor configured to sense a position of the second extendable portion relative to the second fixed portion and generate a second position signal based on the sensed position,
wherein the hitch bar actuator drive logic receives the target relative tractive contribution indicator and identifies a second hitch bar target length based on the target relative tractive contribution indicator wherein the control system receives the second position signal and generates a second target length control signal to control the length between the implement hitch portion and the second MPU connection portion based on the second hitch bar target length.

9. The hitch assembly of claim 7 wherein one or more of the first extendable portion or the second extendable portion is configured to telescope relative to the respective first or second fixed portion.

10. The hitch assembly of claim 1 wherein the first target length control signal controls a steering system of one of the first and second MPUs relative to another one of the first and second MPUs so the first hitch bar portion moves to the first target length.

11. The hitch assembly of claim 1 wherein the control system is disposed on one of the first or second MPUs.

12. The hitch assembly of claim 1 wherein the control system is disposed remotely from the implement hitch portion and from the first and second hitch bar portions.

13. A method, comprising:
sensing a length of a first hitch bar portion on a hitch assembly, the first hitch bar portion having a first modular power unit (MPU) connection portion configured for connection to a first MPU and an implement hitch portion configured for connection to an implement, the first hitch bar portion having a dynamically variable configuration that dynamically varies the length of the first hitch bar portion, the hitch assembly further including a second hitch bar portion, coupled to the implement hitch portion, that has a second modular power unit (MPU) connection portion configured for connection to a second MPU, so the first and second MPUs are substantially connected in parallel with one another;
generating a first position signal indicative of the sensed length of the first hitch bar portion; and
generating a first target length control signal to dynamically vary the length of the first hitch bar portion to vary a distance between the first MPU connection portion and the second MPU connection portion based on a first hitch bar target length and the first position signal.

14. The method of claim 13 wherein generating the first target length control signal comprises:
identifying a target relative tractive contribution of the first and second MPUs;
generating a target relative tractive contribution indicator indicative of the target relative tractive contribution; and
identifying the first hitch bar target length based on the target relative tractive contribution indicator.

15. The method of claim 14 and further comprising:
providing the first target length control signal to a first actuator, coupled to the first hitch bar portion; and
driving variation in a length between the implement hitch portion and the first MPU connection portion, with the first actuator, based on the first target length control signal.

16. The method of claim 15 wherein the first hitch bar portion includes a first fixed portion, and a first extendable portion and wherein driving variation comprises:
driving movement of the first extendable portion relative to the first fixed portion.

17. The method of claim 16 wherein sensing the length of the first hitch bar portion comprises:
sensing a position of the first extendable portion relative to the first fixed portion and wherein generating the first position signal comprises generating the first position signal based on the sensed position.

18. The method of claim 13 wherein generating the first target length control signal to control the sensed length comprises:
controlling steering of one of the first and second MPUs relative to another one of the first and second MPUs so the first hitch bar portion moves to the first target length.

19. A hitch architecture, comprising:
a hitch bar assembly, comprising:
an implement hitch portion configured to couple an implement to the hitch bar assembly;
a first hitch bar portion, coupled to the implement hitch portion, that has a first modular power unit (MPU) connection portion configured for connection to a first MPU, the first hitch bar portion having a dynamically variable configuration that dynamically varies a length of the first hitch bar portion;
a first hitch bar position sensor that generates a first position signal indicative of the length of the first hitch bar portion between the implement hitch portion and the first MPU connection portion; and
a second hitch bar portion, coupled to the implement hitch portion, that has a second modular power unit (MPU) connection portion configured for connection to a second MPU, so the first and second MPUs are substantially connected in parallel with one another;
a relative tractive contribution identifier that identifies a target relative tractive contribution of the first and second MPUs and generates a target relative tractive contribution indicator indicative of the target relative tractive contribution; and
a control system that receives the first position signal and the target relative tractive contribution indicator and generates a first hitch bar target length based on the target relative tractive contribution indicator and generates a first target length control signal to dynamically vary the length of the first hitch bar portion to vary a distance between the first MPU connection portion and the second MPU connection portion based on the first hitch bar target length and the first position signal.

20. The hitch architecture of claim 19 wherein the first hitch bar portion includes a first fixed portion and a first extendable portion and wherein the hitch bar assembly further comprises:
a first actuator, coupled to the first hitch bar portion and configured to receive the first target length control signal and drive variation in a length between the implement hitch portion and the first MPU connection portion based on the first target length control signal by driving movement of the first extendable portion relative to the first fixed portion.

* * * * *